United States Patent [19]

Francis

[11] 4,001,949
[45] Jan. 11, 1977

[54] DYNAMIC FIRE SIMULATOR AND TRAINER

[75] Inventor: David N. Francis, Marinette, Wis.

[73] Assignee: The Ansul Company, Marinette, Wis.

[22] Filed: May 9, 1975

[21] Appl. No.: 576,218

[52] U.S. Cl. .................................................. 35/10
[51] Int. Cl.² ......................................... G09B 9/00
[58] Field of Search ................ 35/10, 13, 11, 12 T; 235/184, 185, 151.34

[56] References Cited

UNITED STATES PATENTS

| | | | |
|---|---|---|---|
| 2,850,615 | 9/1958 | Luse, Jr. et al. ................. | 219/39 |
| 3,040,622 | 6/1962 | Reddle et al. ..................... | 88/24 |
| 3,071,872 | 1/1963 | Hart ................................. | 35/8 |
| 3,452,453 | 7/1969 | Ohlund ............................. | 35/25 |
| 3,469,905 | 9/1969 | Baldwin et al. ................... | 352/39 |
| 3,472,587 | 10/1969 | Liguori ............................. | 353/35 |
| 3,559,996 | 2/1971 | Hopp ............................... | 273/176 |
| 3,580,978 | 5/1971 | Ebeling ............................ | 35/10.2 |
| 3,594,077 | 7/1971 | Marquis ............................ | 353/94 |
| 3,675,342 | 7/1972 | Wolff ................................ | 35/10 |
| 3,675,343 | 7/1972 | Swiatosz et al. ................. | 35/10 |
| 3,679,303 | 7/1972 | La Vant ............................ | 355/40 |
| 3,686,505 | 8/1972 | De Pasquale ..................... | 250/208 |
| 3,690,675 | 9/1972 | Conklin ........................... | 273/185 R |
| 3,712,724 | 1/1973 | Courtney-Pratt ................. | 353/25 |

OTHER PUBLICATIONS

Los Angeles Times, Apr. 28, 1975, p. 8.

*Primary Examiner*—William H. Grieb

[57] ABSTRACT

A method and system for providing realistic on-line fire responses in accordance with the accuracy of an on-line fire fighting sequence employed by a fire fighter, including the steps of dynamically simulating the occurrence of an actual fire, establishing a predetermined fire fighting sequence to be followed by the fire fighter for properly extinguishing the simulated fire, monitoring the actual on-line fire fighting sequence employed by the fire fighter in fighting the simulated fire, comparing the actual fire fighting sequence employed by the fire fighter with the predetermined fire fighting sequence, and providing a reaction in accordance with a correspondence between the actual on-line fire fighting sequence employed by the fire fighter and the predetermined fire fighting sequence to provide realistic on-line fire responses.

12 Claims, 22 Drawing Figures

DYNAMIC FIRE SIMULATOR AND TRAINER

The present invention relates to fire simulators and trainers, and more specifically to a dynamic fire simulator and trainer having a predetermined fire fighting sequence against which the on-line fire fighting sequence employed by a fire fighter is evaluated.

Almost all large fires start small, but do not always remain small. By the time professional fire fighters arrive at the scene, those fires may be much larger, and out of control. In putting out fires, seconds count and the first few minutes are the most critical. The period of time between the outbreak of fire and the arrival of the fire department is the time for first aid fire extinguishment. How effective these first aid measures are depends on two factors: the availability of the right first aid fire extinguishing equipment and the availability of people who are knowledgeable about how to use the equipment.

Last year American industry spent approximately 250 million dollars on first aid equipment. So more often than not the right fire fighting equipment is in the right place ready for use. Additionally, there are usually people available to man the equipment. However all too often these people do not understand the capabilities and limitations of the equipment or how to use it effectively. If they did, it is highly probable hundreds of lives would be saved, thousands of injuries prevented, and millions of dollars in property losses avoided.

One approach to this fire problem lies in "first aid" fire training. That is, training the "man on the spot" so that he or she understands the capability of the equipment at hand, knows how to use it and, maintains his or her composure in an emergency.

Assuming the need for first aid fire training, as well as primary fire training, it is highly desirable in both cases for an on-line type of training in which the trainee sees the fire, feels the heat, and experiences its trauma while putting it out. No classroom or theatrical approach can substitute for real on-line fire fighting experience.

Until recently, such on-line fire fighting experiences was provided by controlled fires were set and extinguished, creating billows of dirty smoke and consuming a lot of fuel in the process. Thus, it is apparent that the setting of controlled fire is wasteful with regard to fuel consumption as well as producing environmental pollution. Moreover, the increasing emphasis on ecology has resulted in local and state ordinances which make it difficult and in some cases actually prohibit the setting of controlled fires for fire training purposes.

In view of the recent emphasis on ecology and the resulting implementing legislation, and the recent concern over energy conservation, there is a clear need for a realistic fire simulator and trainer which does not waste fuel or contribute to environmental pollution.

Fire simulators are known in the art. See, for example, U.S. Letters Pat. No. 3,675,342 (Wolff) and U.S. Letters Pat. No. 3,675,343 (Swiatosz et al.). However, such known fire simulators lack the realism of an actual fire with flames and smoke. Moreover, such known fire simulators lack any standard or predetermined fire fighting sequence against which the sequence employed by the on-line fire fighter (trainee) is compared to provide realistic on-line fire responses.

It is an object of the present invention to provide a dynamic fire simulator which closely simulates the conditions and behavior of an actual fire to provide the same emotional impact on the fire fighter as an actual fire.

It is another object of the present invention to provide a dynamic fire simulator and trainer which provides realistic on-line fire responses in accordance with the correspondence between the on-line performance of a fire fighter and a standard.

It is a further object of the present invention to provide a dynamic fire simulator and trainer in which the simulated fire responds realistically to the actions of a fire fighter to provide him with on-line training with respect to the proper fire fighting sequence.

It is a still further object of the present invention to provide a mobile dynamic fire simulator and trainer.

Other objects, aspects, and advantages of the present invention will be apparent when the detailed description is considered with the drawings.

Briefly, the present invention includes the method and system for providing realistic on-line fire responses in accordance with the accuracy of an on-line fire fighting sequence employed by a fire fighter, including the steps of dynamically simulating the occurrence of an actual fire, establishing a predetermined fire fighting sequence to be followed by the fire fighter for properly extinguishing the simulated fire, monitoring the actual on-line fire fighting sequence employed by the fire fighter in fighting the simulated fire, comparing the actual fire fighting sequence employed by the fire fighter with the predetermined proper fire fighting sequence, and providing a reaction in accordance with a correspondence between the actual on-line fire fighting sequence employed by the fire fighter and the predetermined fire fighting sequence to provide realistic on-line fire responses.

The dynamic fire simulator and trainer according to the present invention is illustrated in the drawings, in which.

Figure 1:
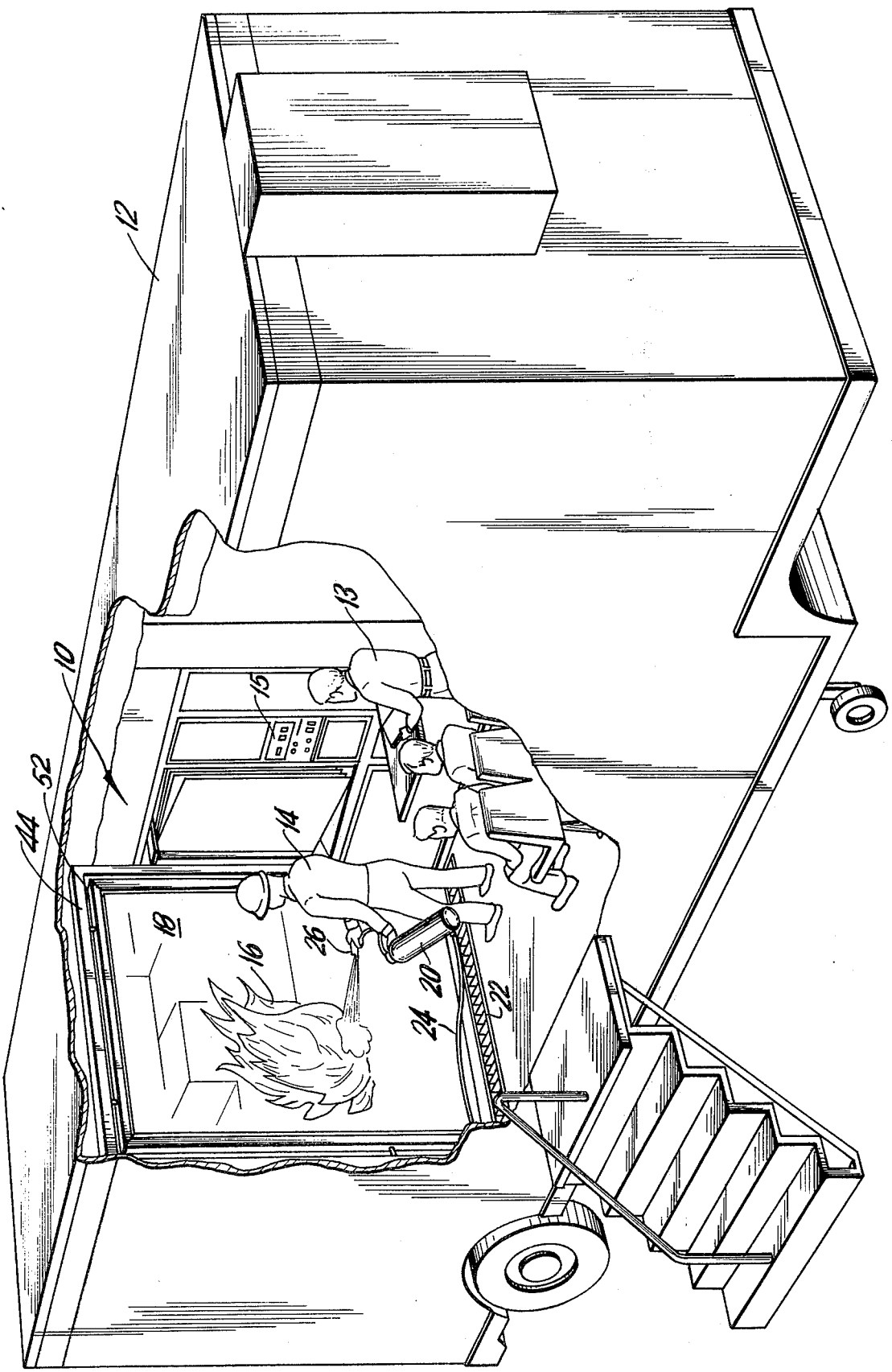
FIG. 1 is a perspective view of a mobile van with parts broken away to expose the dynamic fire simulator and trainer being used by a fire fighter.

Referring to FIG. 1, the dynamic fire simulator and trainer, generally indicated at 10, is shown arranged in a mobile van 12. A fire fighter or trainee 14 is shown in the actual process of fighting a simulated fire 16.

To begin a fire fighting sequence, the trainee 14 approaches a rear projection screen 18, such as a rigid ⅛ inch acrylic screen available from Stewart Filmscreen Corporation and known as Lumiglass 150. Upon being given the "go ahead" signal by an instructor 13, who has activated the dynamic fire simulator and trainer 10 via a front control panel 15, the trainee 14 readies a modified conventional fire extinguisher 20 and uses it in an on-line fire fighting sequence in an attempt to extinguish the simulated fire 16.

The conventional fire extinguisher 20, for example an Ansul Model 20 E Extinguisher, is modified to emit $CO_2$ in a gas cloud to simulate the release of dry chemicals. The released $CO_2$ is exhausted through a vent 22. Moreover, the fire extinguisher 20 is coupled to a $CO_2$ reservoir (not shown) in the van 12 via a hose 24. The pressure of the gas transmitted from the reservoir is controlled by a conventional pressure regulator and monitored by gages. Further, it has been found advantageous to employ a filter to prevent contaminants from reaching the nozzle 26 and interfering with the production of the desired gas cloud. The operation of the fire extinguisher 20 will be discussed in more detail with reference to FIG. 9.

Figure 2:
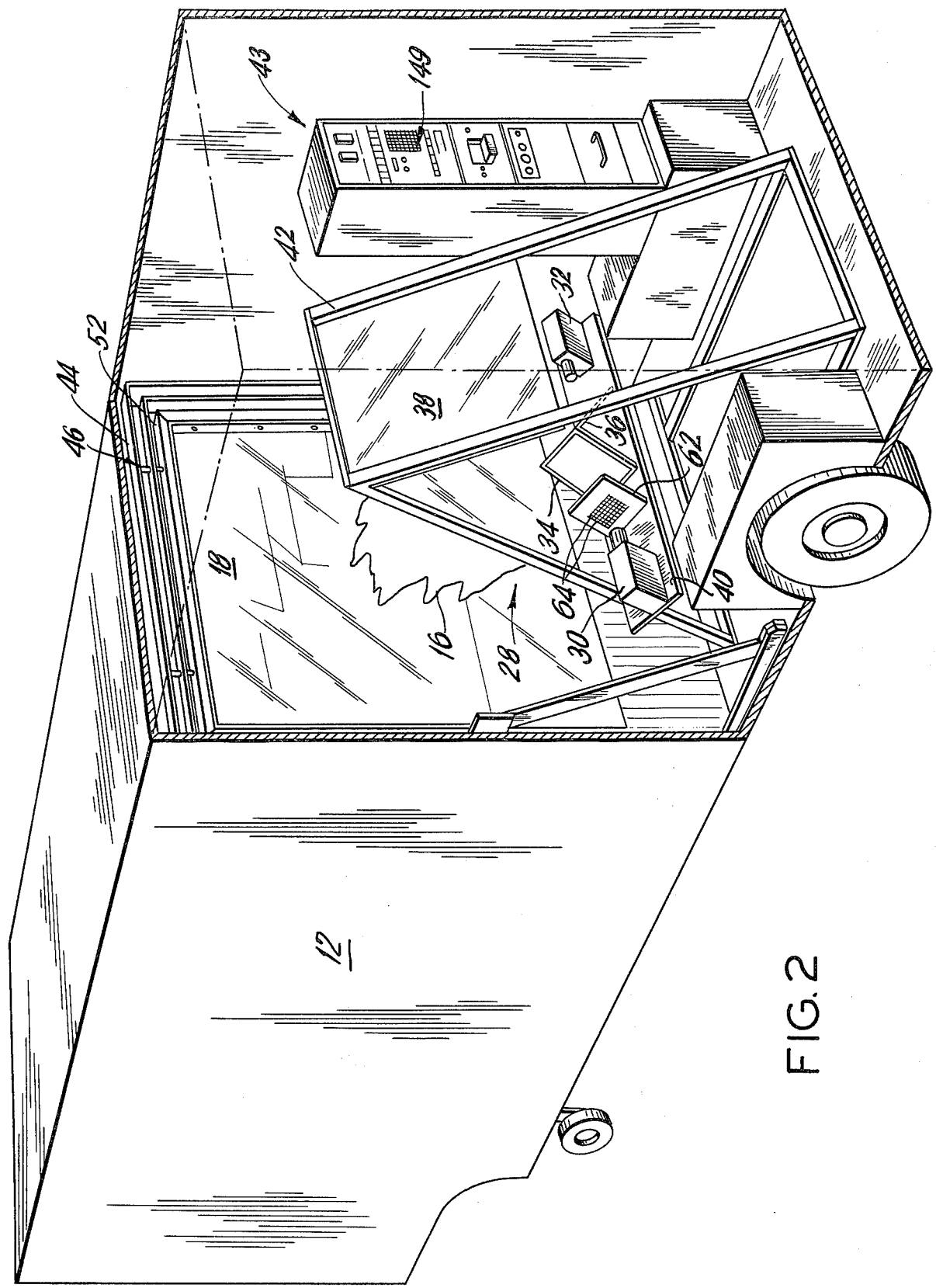
FIG. 2 is a perspective view of the mobile van with parts broken away to expose the rear screen projection system and control means for the dynamic fire simulator and trainer.

Referring to FIG. 2, a rear screen projection system for use in the dynamic fire simulator and trainer 10 is generally indicated at 28. The rear screen projection system 28 includes a fixedly mounted motion picture projector 30, such as a Bell & Howell Model No. 567 (16 mm) with a high intensity lamp, modified to accommodate a film loop, and a fixedly mounted scene projector 32 arranged in juxtaposition to the motion picture projector 30. The scene projector 32 may be the same as the motion picture projector 30, but has a film loop with a single static scene.

Positioned between the motion picture projector 30 and the scene projector 32 is a pair of mirrors 34 and 36 for reflecting the motion picture and scene images. The mirrors 34 and 36 have their upper edges arranged at an angle of approximately 60° for reflection of the motion picture and scene images onto a secondary mirror 38. The secondary mirror 38 is arranged relative to the mirrors 34 and 36 to receive the combined motion picture and scene images and reflect them onto the rear of the rear projection screen 18. The motion picture projector 30, scene projector 32, and mirrors 34 and 36 are mounted on a support member 40 which is affixed to an A-frame assembly 42. The secondary mirror 38 is also mounted on the A-frame assembly 42 to receive the images reflected by the mirrors 34 and 36. It should be apparent that secondary mirror 38 is employed due to the space limitations imposed by the mobile van 12 and that it may be eliminated, e.g., in a stationary environment where constraints on space are not as limited. Generally, the distance between the secondary mirror 38 and the rear projection screen is approximately 10 feet.

The rear projection screen 18, which has a viewing height of approximately 90 inches and a viewing width of approximately 72 inches, is held under tension by a support frame 44 so that the rear projection screen 18 is constrained against movement in a direction normal to the application of impact force resulting from the $CO_2$ discharged from the fire extinguisher 20, but is capable of being deflected rearwardly in the direction normal to the plane of the screen 18. An electronics control cabinet 43 is positioned adjacent the A-frame assembly in the rear of the van 12. This cabinet 43 will be discussed in more detail below with reference to other components of the dynamic fire simulator and trainer 10.

Figure 3:
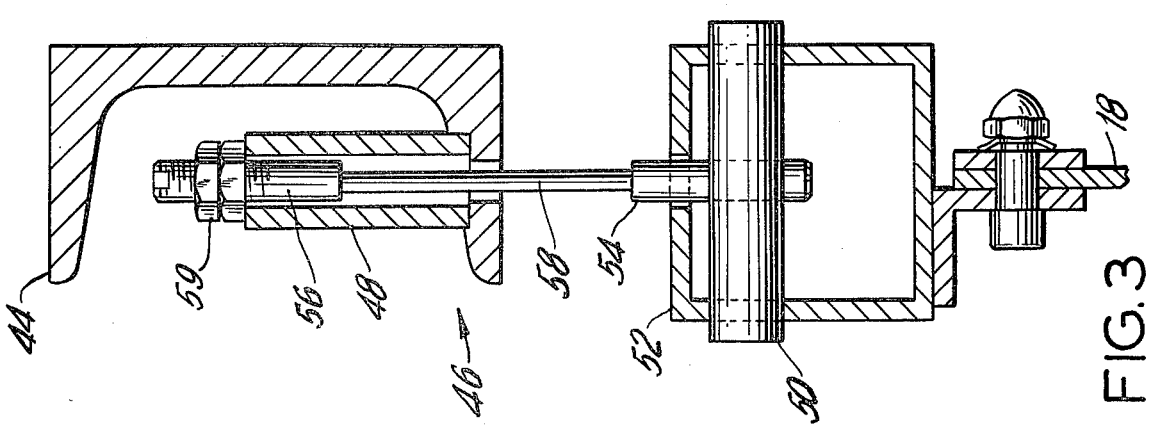
FIG. 3 is a sectional view of a screen suspension means for use in the dynamic fire simulator and trainer.

Referring to FIG. 3, the screen 18 is suspended at its upper and side edges by four screen hangers 46. Each screen hanger 46 includes a sleeve 48 affixed to the support frame 44 and a barrel nut 50 coupled to an edge frame 52 of the screen 18. The barrel nut 50 is linked to a first threaded rod 54 which is linked to a second threaded rod 56 by a steel wire 58. Jam nuts 59 are mechanically coupled to the second threaded rod 56 and bear against the upper end of the sleeve 48. It is apparent that the amount of tension under which the screen 18 is held is dependent upon the tension exerted on the edge frame 52 by the wire 58 which is controlled by the jam nuts 59. Therefore, the screen 18 is held suspended in its plane by the support frame 44 and screen hangers 46.

Figure 4:
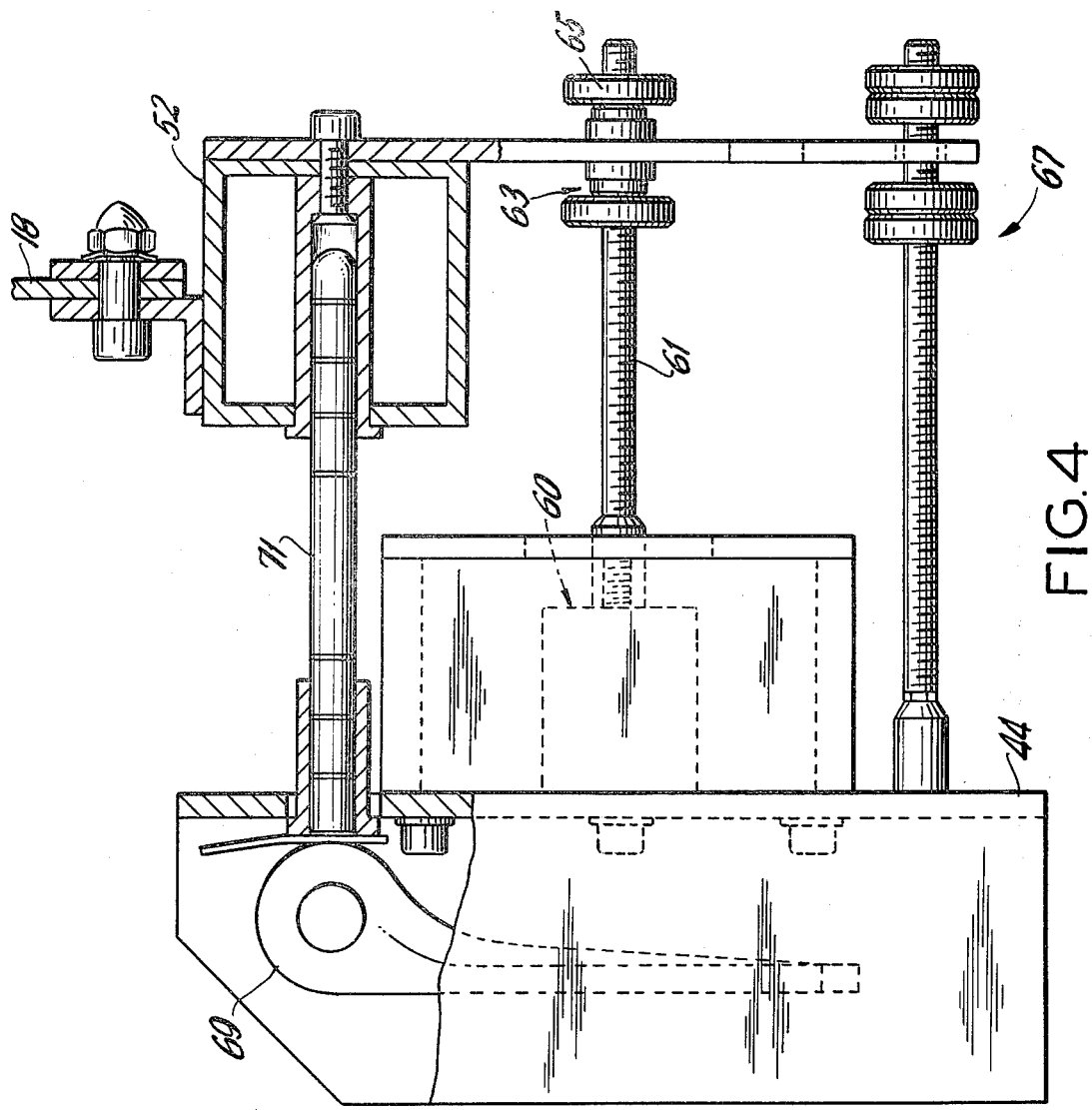
FIG. 4 is a sectional view of a load cell sensor for use in the dynamic fire simulator and trainer.

Referring to FIG. 4, four load cells 60, such as Senosotec 30 series load cells, are mounted on the support frame 44 and mechanically coupled to the corners of the edge frame 52 of the screen 18. These load cells transform the deflection of the screen 18 resulting from the inpact of mechanical force caused by the $CO_2$ gas into a proportional electrical voltage. The force measured at each load cell 60 is dependent upon the total force and the point where the impact force strikes the screen 18. For example, if the $CO_2$ gas is directed at the center of the screen 18, each cell 60 would register equal forces and the magnitude of the force measured by each load cell 60 would equal ¼ the total force. As the point of impact is moved toward the edge or corner of the screen 18, the force on the nearest load cell 60 increases and the forces on the load cells 60 remote from the point of impact decrease. Due to this relationship the point of impact can be accurately determined. Moreover, the total force is directly proportional to the distance of the nozzle 26 from the screen 18, see FIG. 1.

Since only forces from three load cells 60 are required to locate the point of impact, the use of four load cells 60 enables four independent determinations of the point of impact. The weighted average of these measurements, in which more credence is given to the largest load cell forces, is used to obtain a more accurate location for the point of impact. Signal conditioning amplifiers (not shown), such as Action Pak Model 4051, available from Action Instruments Co., Inc., supply the bridge voltage to the load cells 60 and amplify the output from the load cells 60 to provide usable high level DC outputs.

Each load cell 60 includes a movable shaft 61 and a pair of spring plates 63 and 65 which limit movement of the shaft 61 and protect the load cell 60 during overloading. Additionally, an overtravel means 67 is mechanically coupled to the edge frame 52 to prevent damage to the load cell 60, e.g., should someone fall against the screen 18. Moreover, a rotatable arm 69 and movable coupling 71 are provided to take the strain off the load cells 60 when the screen 18 is not being used or the van 12 is in transit.

Referring again to FIG. 2, an optical shutter 62 is mounted on the support member 40 intermediate the motion picture projector 30 and the mirror 34 to intercept the motion picture image. As shown, 48 shutter elements 64 are employed in 6 by 8 matrix. Advantageously, the optical shutter 62 is positioned as close to the film plane of the motion picture projector 30 as is pratical while still having the motion picture image covered by the 48 shutter elements. This provides sufficient defocussing of the motion picture image to obsurce any grating between the shutter elements 64 and adds to the realism of the fire 16.

Figure 5:
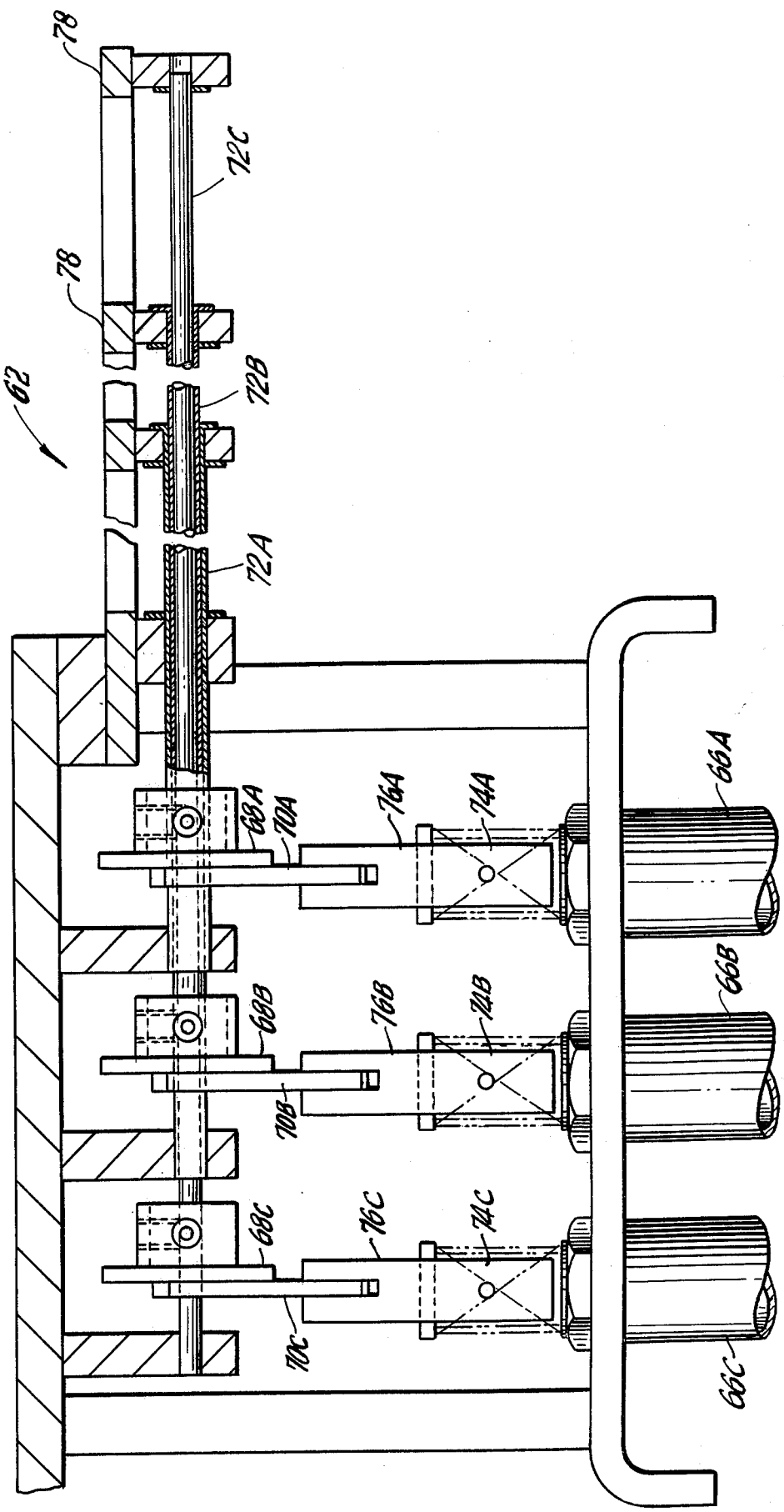
FIG. 5 is a partial sectional view of a shutter for use in the dynamic fire simulator and trainer.
Figure 6:
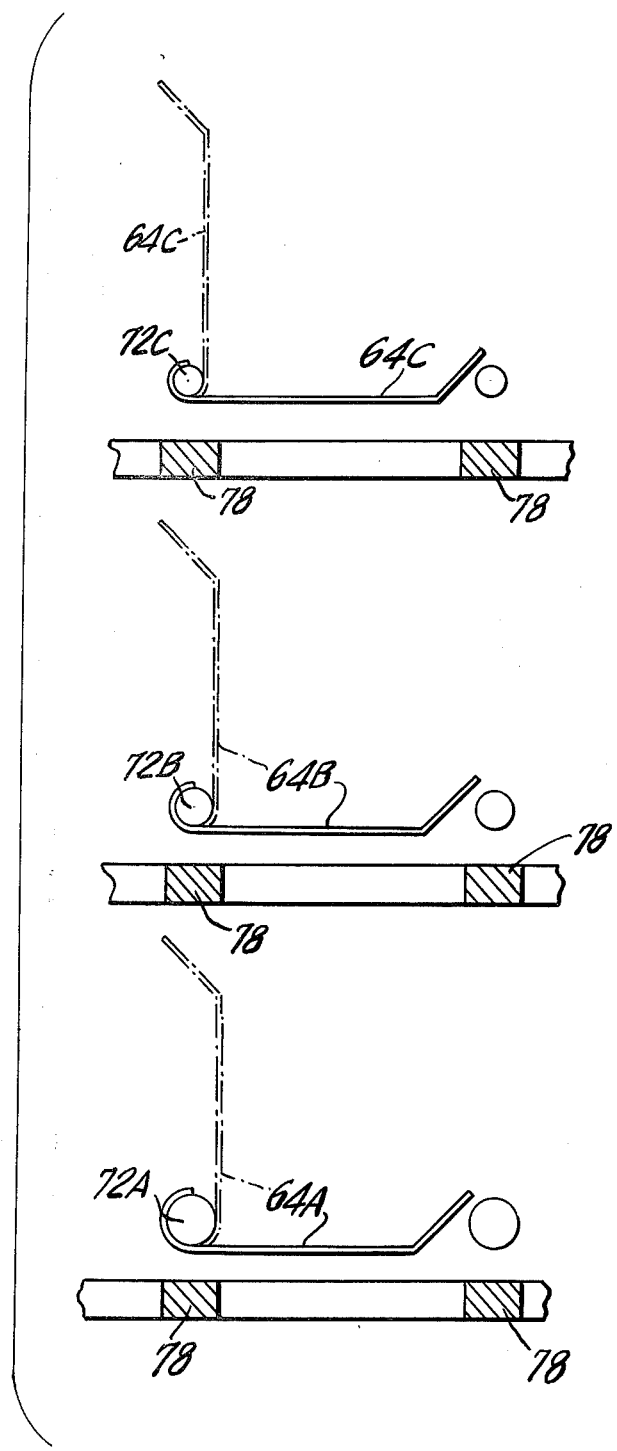
FIG. 6 is an end view of the shutter elements for the shutter of FIG. 5.

Referring specifically to FIG. 5, a sectional view of one-half of the optical shutter 62 is shown with half a row of shutter elements 64, see FIG. 6. The other half of the row of shutter elements 64 is identical in structure and operation. The optical shutter 62 provides an electro-mechanical means of selectively blocking any portion of the motion picture image (flames and smoke) to simulate extinguishment of the fire 16. The shutter elements 64 are in the form of small opaque plates which are normally positioned to interrupt the passage of light. thereby interrupting transmission of the motion picture image to the screen 18. When the shutter elements 64 are rotated 90°, they are effectively removed from the optical path and permit transmission of the motion picture image to the screen 18.

Movement of the opaque plates 64A–C is obtained by corresponding solenoids 66A–C connected to hubs 68A–C by links 70A–C. The hubs 68A–C are mechanically coupled to plate shafts 72A–C. Thus, the linear motion of the solenoid armatures 76A–C is transformed to rotary motion for rotation of the opaque plates 64A–C to an open or closed position, see FIG. 6. Compression springs 74A–C coupled to the solenoid armatures 76A–C to return the opaque plates 64A–C to their normally closed position when the individual solenoids 66A–C are de-energized.

In all, there are 48 solenoids, one associated with each opaque plate 64 so that the opaque plates 64 can be controlled individually, in groups, or all at once. With each opaque plate 64 individually controlled, it is possible to simulate extinguishing of the flames in any portion of the fire 16 and then move in any direction from that portion. As previously described, the motion picture image is defocussed and therefore the shutter frame grating 78 between the elements is not visible on the screen 18. Generally, several adjacent plates 64 must be closed to totally block out a specific area of the fire 16 on the screen 18. This allows for partial dimming of a portion of the fire 16 for improved realism. Moreover, flashback is readily attained in a realistic manner by opening an opaque plate 64 which has been previously closed.

Figure 7:
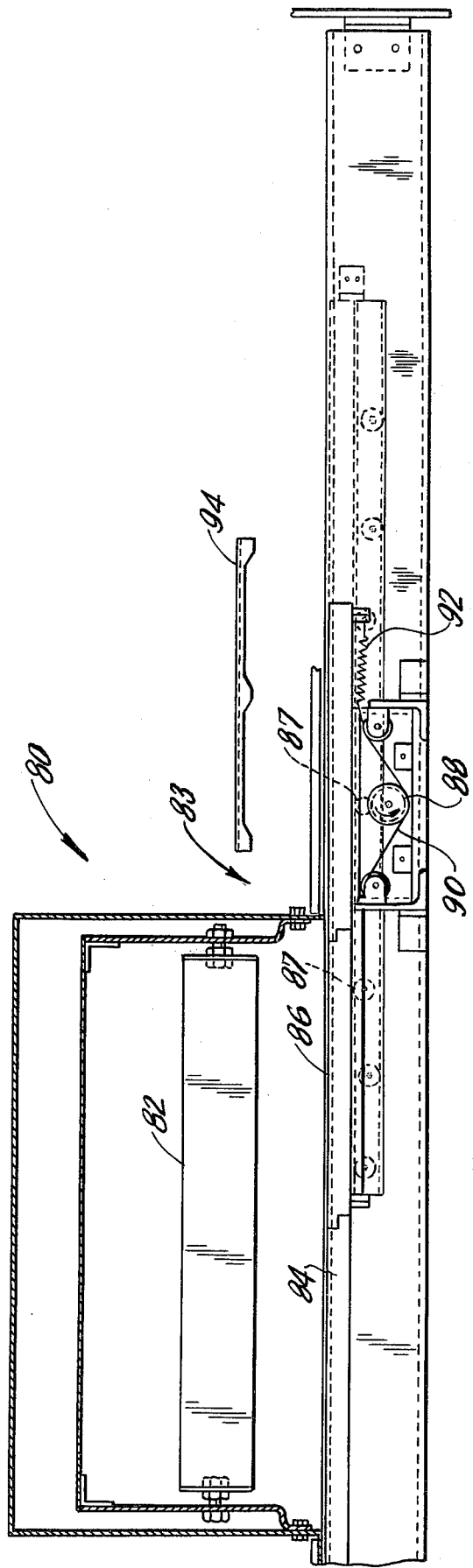
FIG. 7 is a schematic view of the radiant heater and movable door assembly for use in the dynamic fire simulator and trainer.

Referring to FIG. 7, a radiant heat assembly 80 is illustrated. A radiant heating member 82 is shown, such as available from Thermatronics Corporation and composed of three Vycor tubular heaters made by Corning Glass. However, it is preferred that a plurality of radiant heating members 82, e.g., five be used. The function of the five heating members 82 is identical, so that only one will be described. The five heating members 82 are housed in the ceiling of the van 12 in front of the screen 18 and can be adjusted to control the direction of the radiant heat, dependent upon the type of fire being fought, to simulate the actual heat conditions of the fire 16 and enable the trainee 14 to experience these heat conditions. The heating members 82 are activated prior to projection of the fire 16 on the screen 18 so that they are ready to radiate heat when the trainee 14 commences to fight the fire 16.

The amount of heat radiation reaching the trainee 14 may be varied by a movable door assembly 83. The movable door assembly 83 includes movable doors 84 and 86 which slide along roller bearings 87 and are positioned to interrupt or enable transmission of radiant energy toward the trainee 14. In this manner, a source of variable heat is provided which simulates the sensation of heat from the fire 16.

The position of the movable doors 84 and 86 is controlled by a motor driven roller 88 having a cord 90 wrapped around it which is anchored at each end of door 86. (The movement of door 84 is similar and will not be discussed.) A spring 92 is connected between the cord 90 and one end of the door 86 to compensate for mechanical variation and any stretching of the cord 90.

Figure 8:
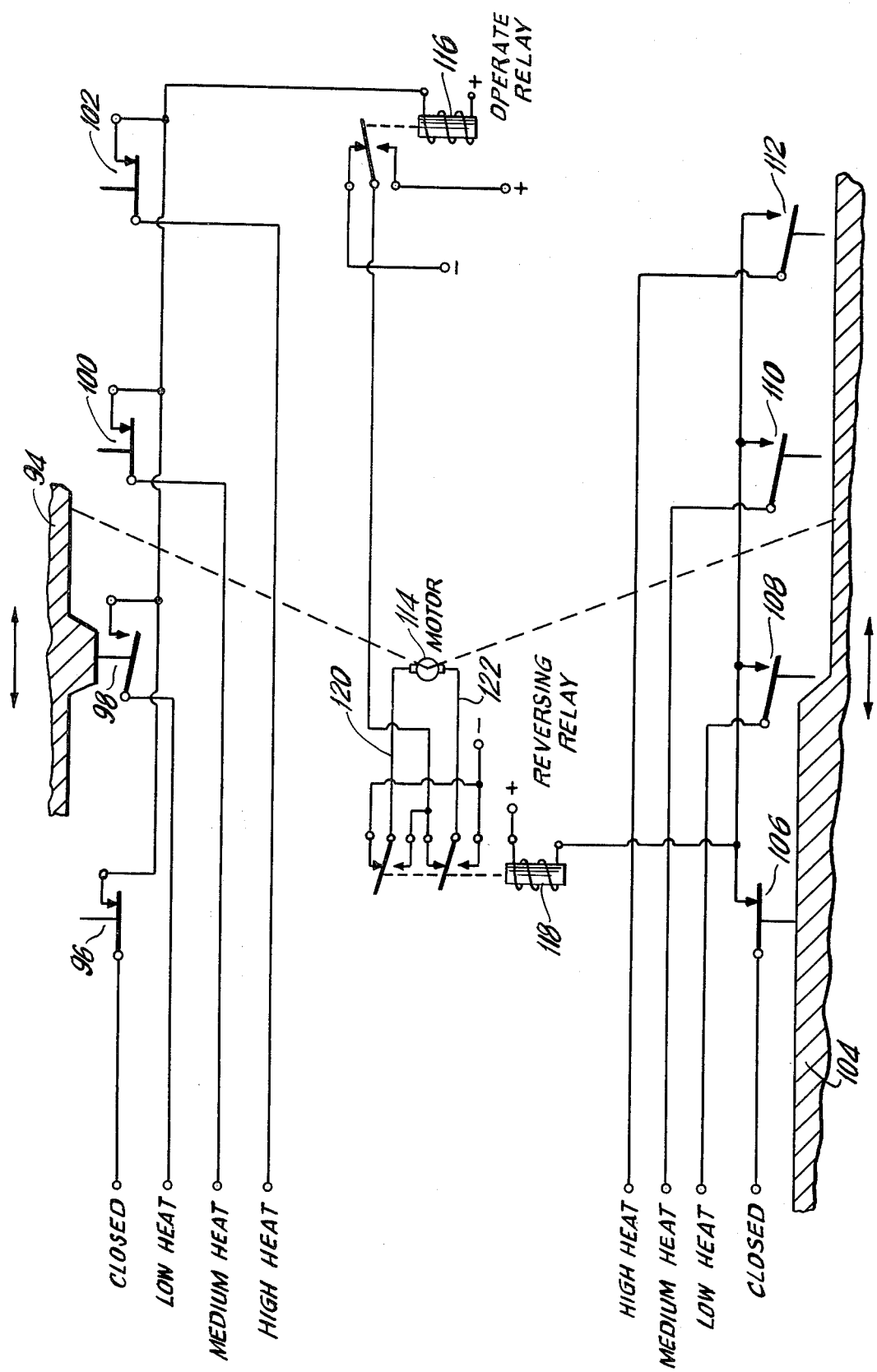
FIG. 8 is a schematic diagram of the control circuitry for the movable door assembly of FIG. 7.

The position of the door 86 is controlled by a cam 94 affixed to the door 86 and cam operated switches 96, 98, 100, and 102, see FIG. 8. When the cam 94 passes under a switch 96–102, the switch is opened to provide positive information as to the position of the door 86. The four switches 96–102 provide four door positions, closed, ⅓ open, ⅔ open, and fully open. It should be understood that any number of switches can be used depending upon the number of heat levels desired. As seen in FIG. 8, another cam 104 activates another set of switches 106–112, to drive motor 114 coupled to the motor driven roller 88 in the proper direction to reach the desired heat level.

Referring specifically to FIG. 8, the cams 94 and 104 are shown positioned in the low heat (⅓ open) position. If it is desired to close the door 86, the leads marked closed are connected to the negative supply. The operate and reversing relays 116 and 118 are energized and the motor 114 is energized to move the cams 94 and 104, and therefore the door 86, to the left in FIG. 8. When the cam 94 opens the cam switch 96 connected to the closed lead, the operated relay 116 opens and the motor 114 is de-energized at that position. Opening the operate relay 116 connects the motor leads 120 and 122 together to dynamically brake the motor 114, stopping it immediately. If it is desired to further open the door 86, the medium heat or high heat leads are connected to the negative supply. The operation is the same as previously described, except that the reversing relay 118 does not operate and the motor 114 rotates in the opposite direction.

Figure 9:
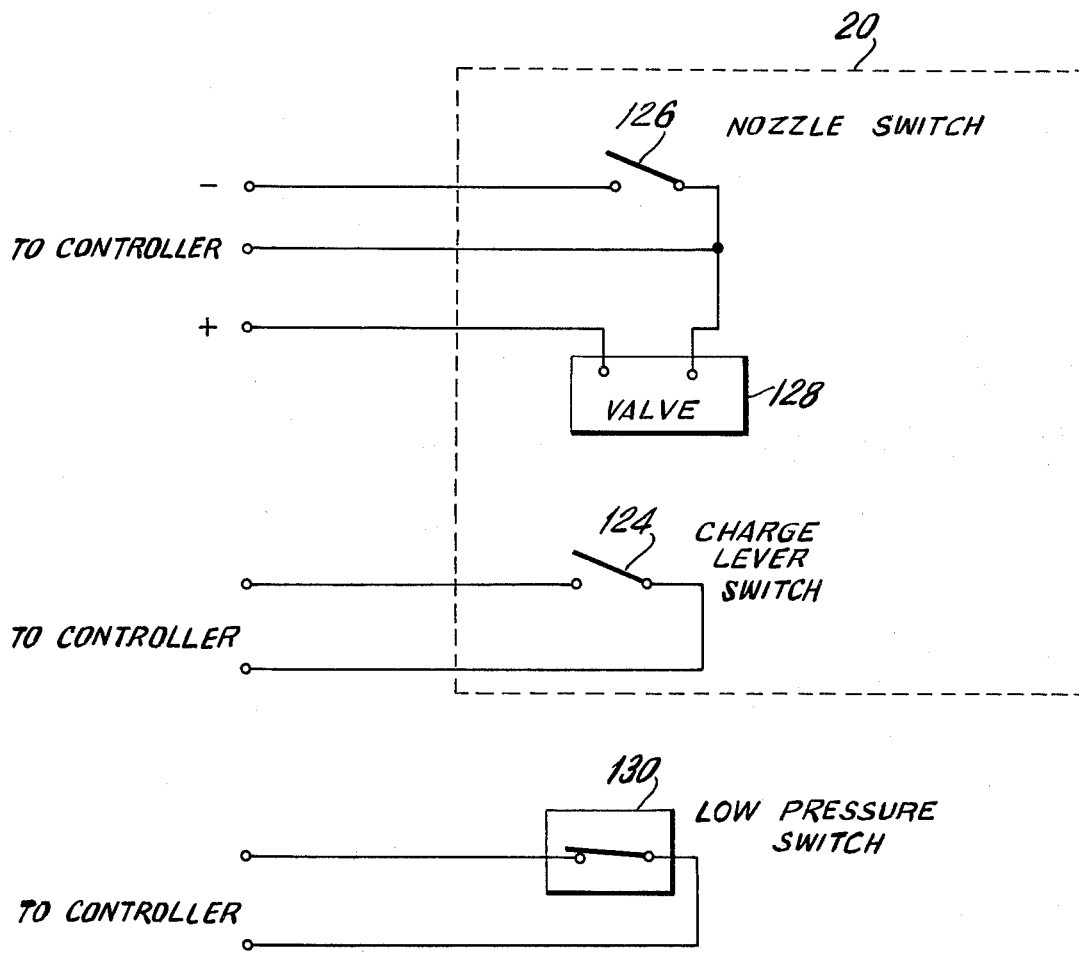
FIG. 9 is a schematic of the fire extinguisher switch assembly.

Referring to FIG. 9, a schematic of the fire extinguisher 20 is shown. A charge lever switch 124 is positioned below the charge puncture lever (not shown). This switch 124 is closed momentarily when the charge puncture lever is depressed and released to simulate the charging operation of an actual fire extinguisher and signals the controller 132 for energizing a solenoid valve 128 located in the bottom of the fire extinguisher 20. A nozzle switch 126 is mounted under the nozzle handle (not shown) which closes when the nozzle 26 is squeezed. The solenoid valve 128 opens when the nozzle switch 126 is closed, assuming the charge switch 124 was previously closed, to allow $CO_2$ to pass through the nozzle 26. The nozzle 26 is shaped to be the major restriction to the flow of $CO_2$. This ensures that most of the expansion of $CO_2$ occurs in the nozzle 26 so that a realistic gas cloud is produced, as well as minimizing the number of points where cold temperatures are produced as a result of unwanted expansion. $CO_2$ pressure in the reservoir (not shown) is, e.g., approximately 900 p.s.i. The nozzle pressure is significantly lower, e.g., between about 200 to 300 p.s.i. A low pressure switch 130 positioned at the reservoir is closed to provide a warning and prevent the starting of another actual on-line fire fighting sequence whenever the pressure in the $CO_2$ reservoir drops below a minimum pressure required for production of a realistic gas cloud, e.g., about 600 p.s.i.

Figure 10:
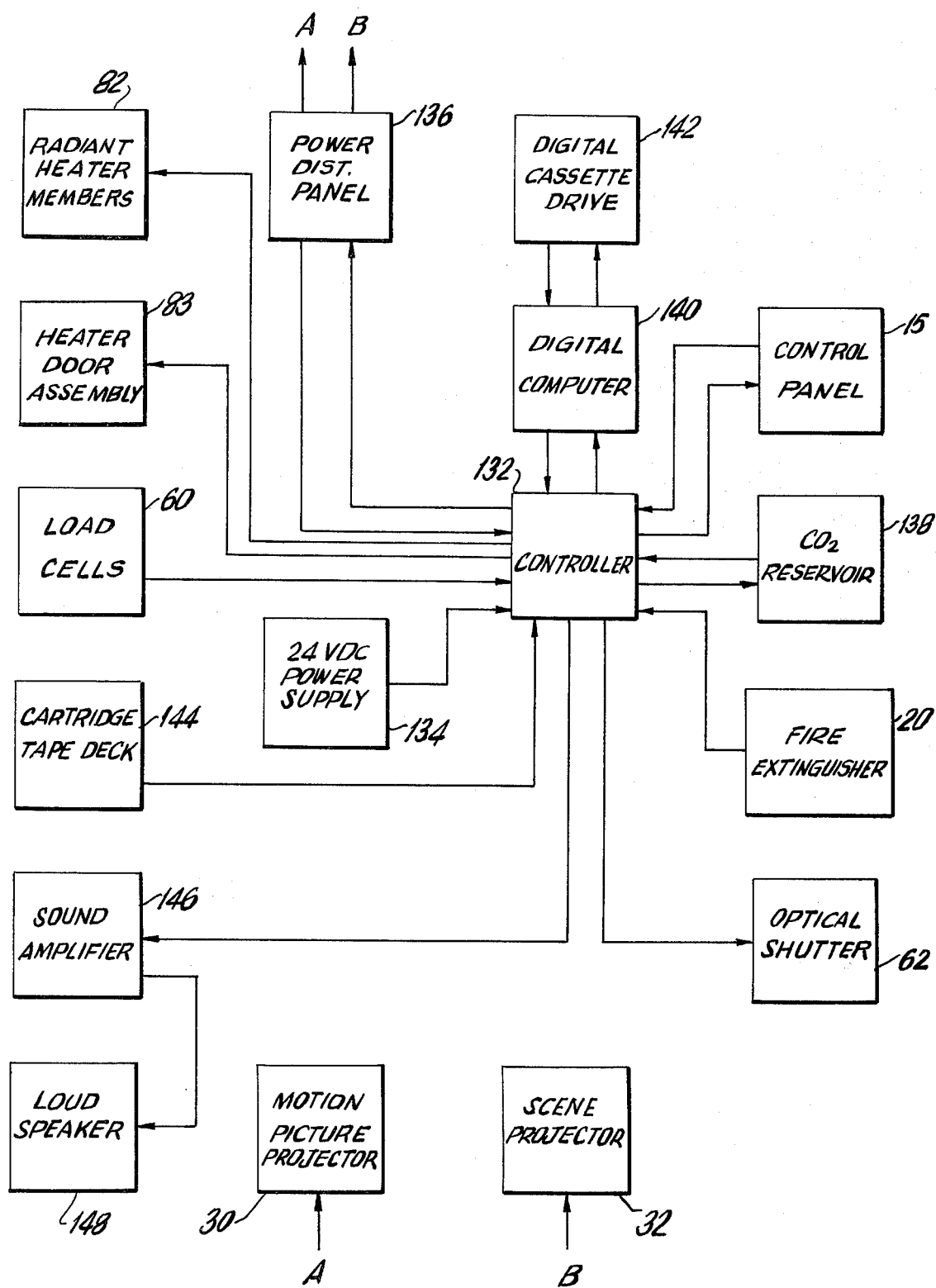
FIG. 10 is a block diagram of the dynamic fire simulator and trainer.

Referring to FIG. 10, a block diagram of the dynamic fire simulator and trainer 10 is illustrated. The motion picture projector 30 and scene projector 32 are activated independently of the controller 132. The remaining block elements are all operated or monitored through the controller 132. D.C. power to the controller is provided by a 24 VDC power supply 134, such as a Sola Model 281203-2 power supply. A.C. power to the components of the dynamic fire simulator and trainer 10 is provided through relays in a power distribution panel 136 under control of the controller 132. The power distribution panel 136 provides the power to the motion picture projector 30 and scene projector 32. In addition to sending signals to and receiving signals from the power distribution panel 136, the controller 132 sends signals to and receives signals from the control panel 15, the $CO_2$ reservoir 138, and a digital computer 140, such as Digital Equipment Corporation Model PDP11 Computer. The digital computer 140 receives and transmits signals to a digital cassette drive 142 for loading the selected fire type data into the computer 140.

The controller 132 also receives signals from the fire extinguisher 20, a conventional cartridge tape deck 144, and load cells 60, and sends signals to the radiant heater members 82, heater door assembly 83, a sound amplifier 146, such as Bogen Model C-20A, and the optical shutter 62. The output of the sound amplifier 146 is electrically coupled to a conventional loud speaker 148.

Figure 11:
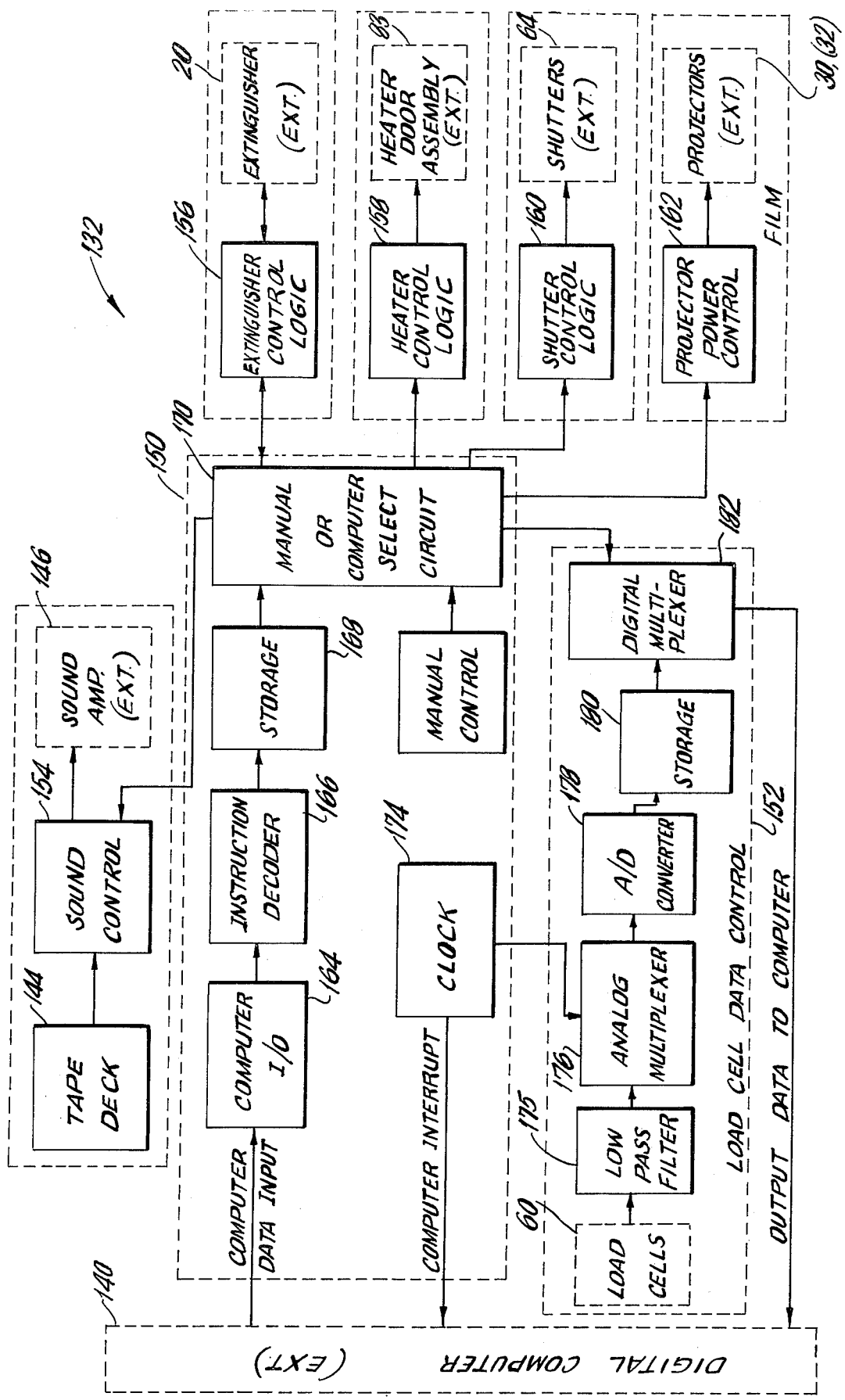
FIG. 11 is a block diagram of a controller for use in the dynamic fire simulator and trainer.
Figure 12:
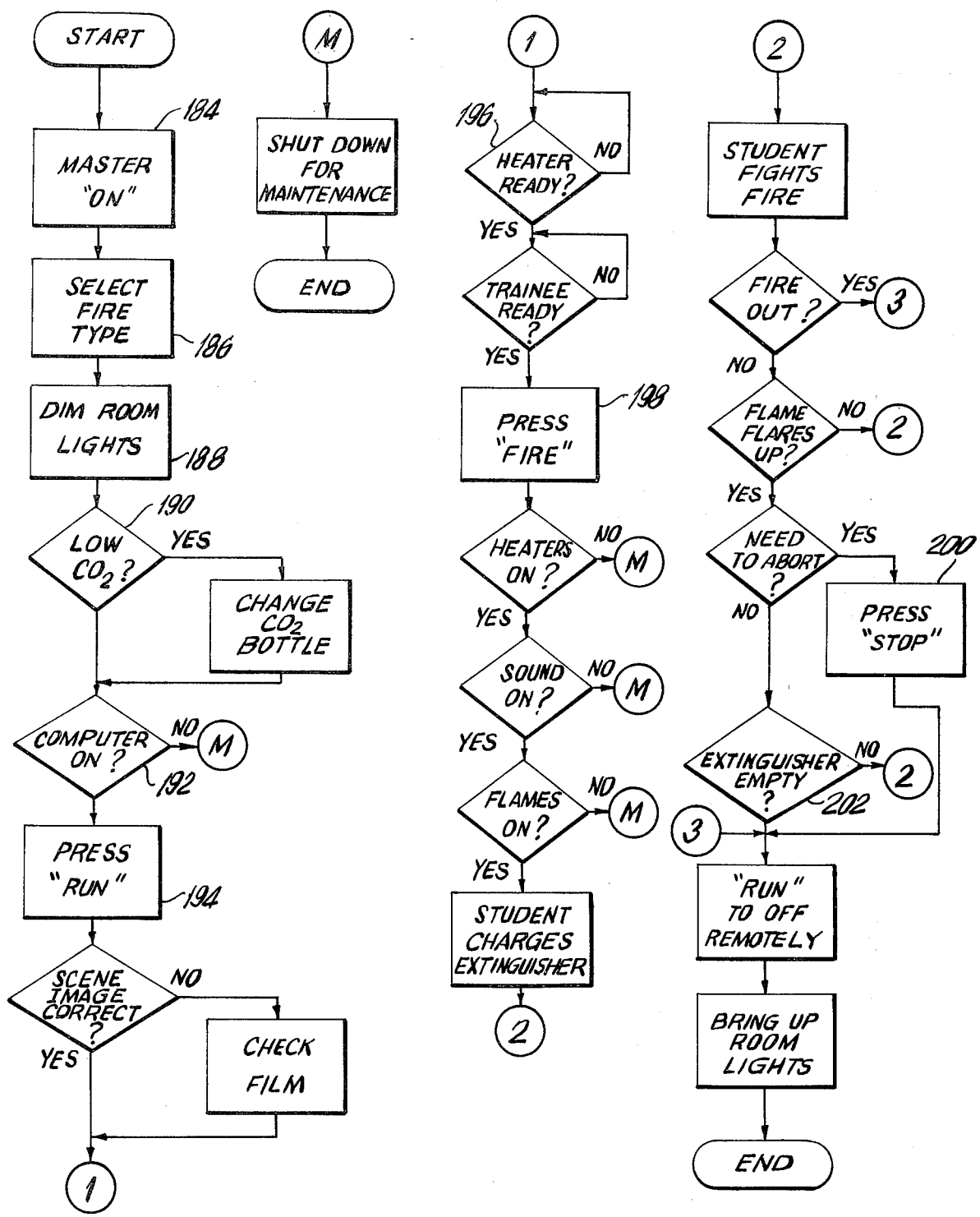
FIG. 12 is a flow chart for the operation of the dynamic fire simulator and trainer.
Figure 13:
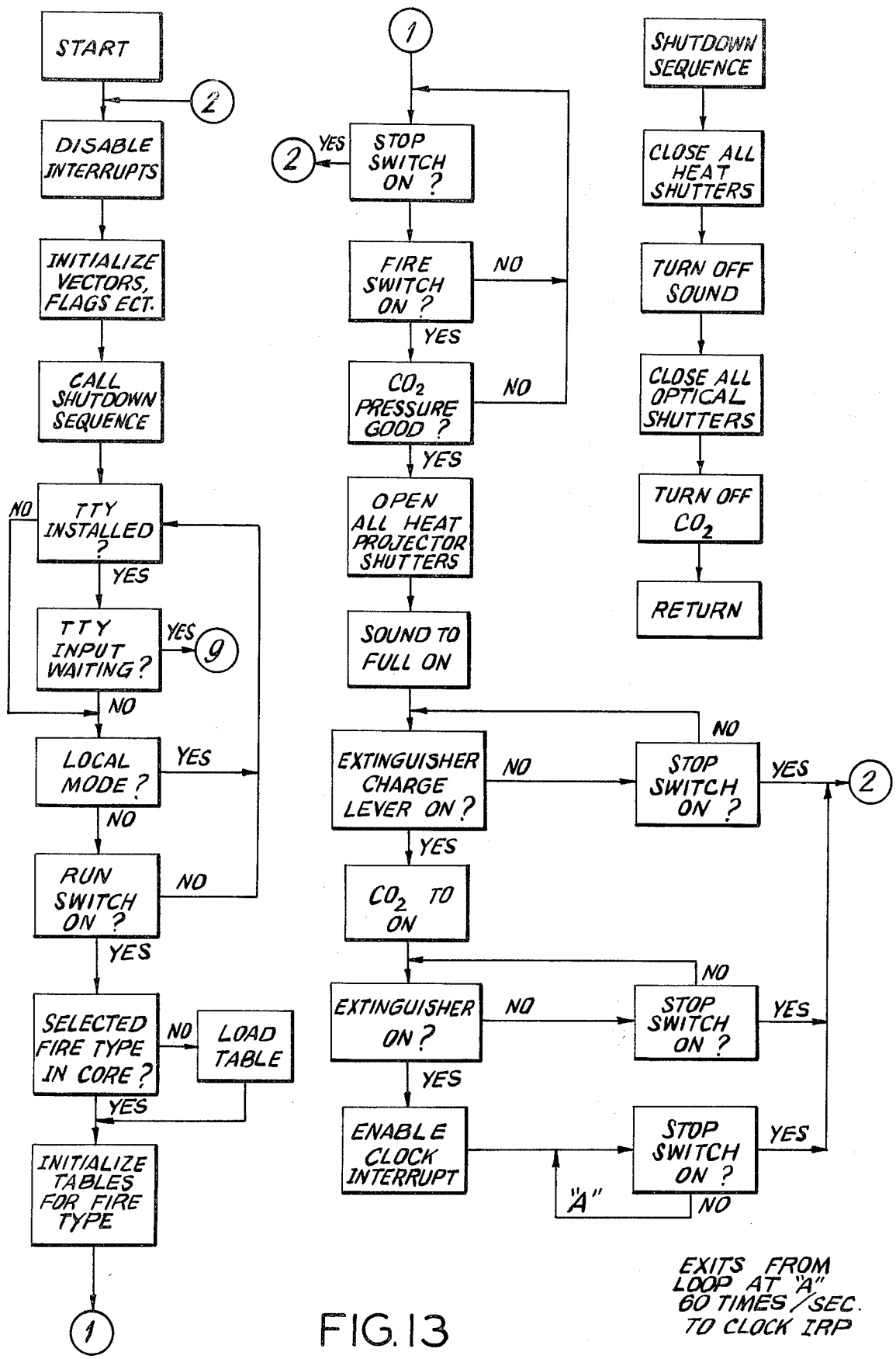
FIG. 13 is a flow chart of an executive routine for use in the dynamic fire simulator and trainer.
Figure 14:
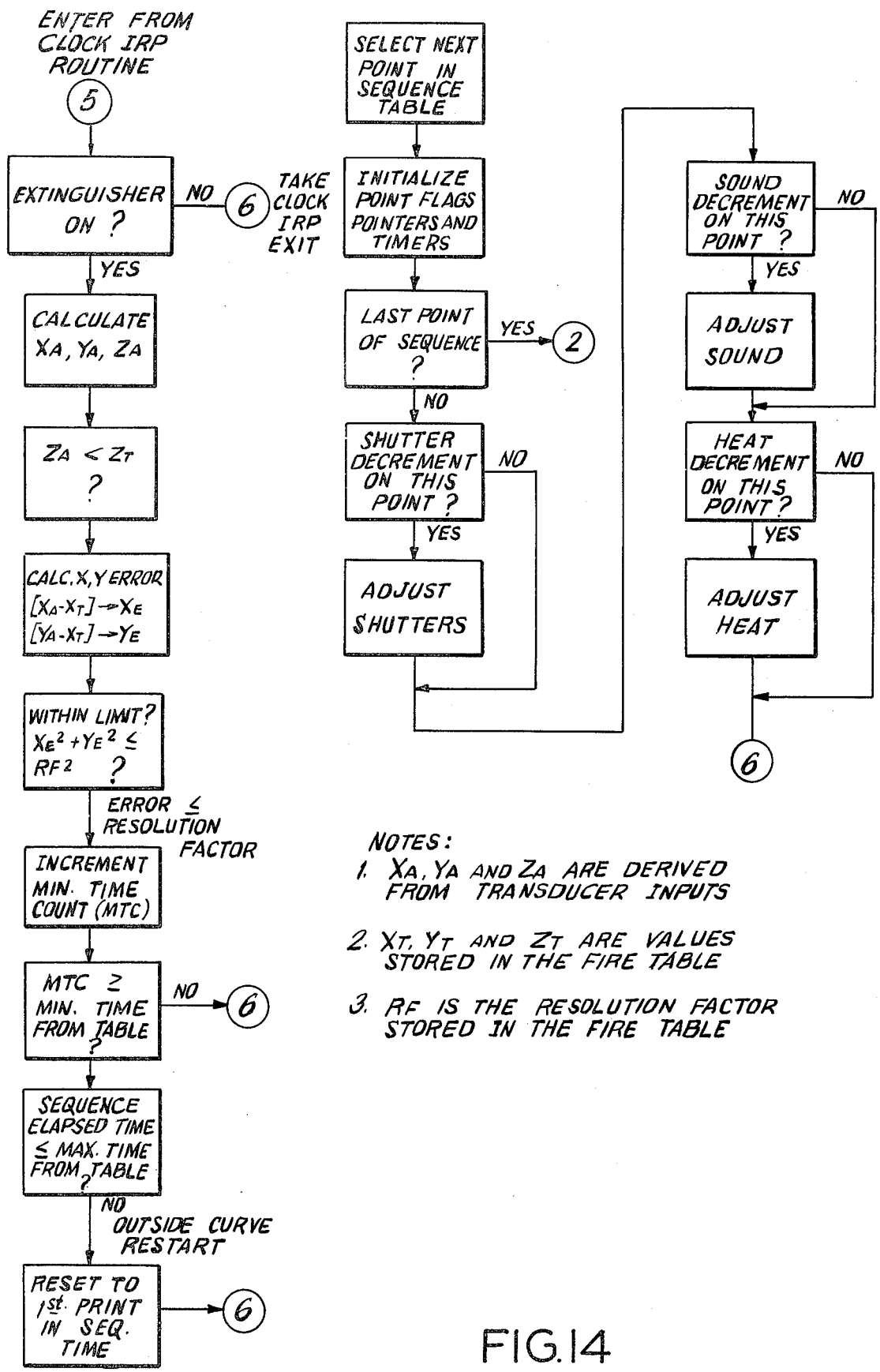
FIG. 14 is a flow chart of a curve fit subroutine for use in the dynamic fire simulator and trainer.
Figure 15:
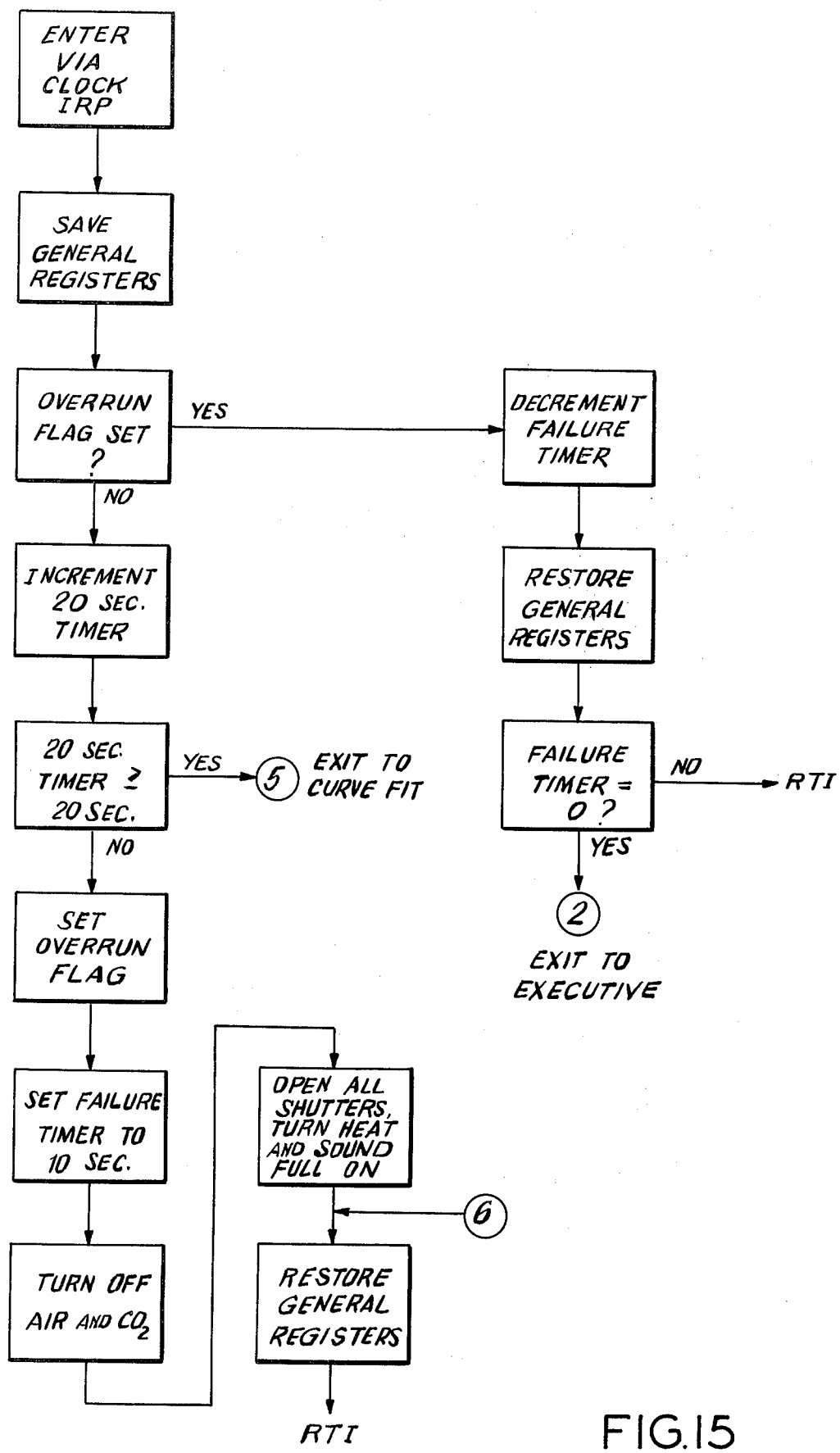
FIG. 15 is a flow chart of a clock interrupt subroutine for use in the dynamic fire simulator and trainer.
Figure 16:
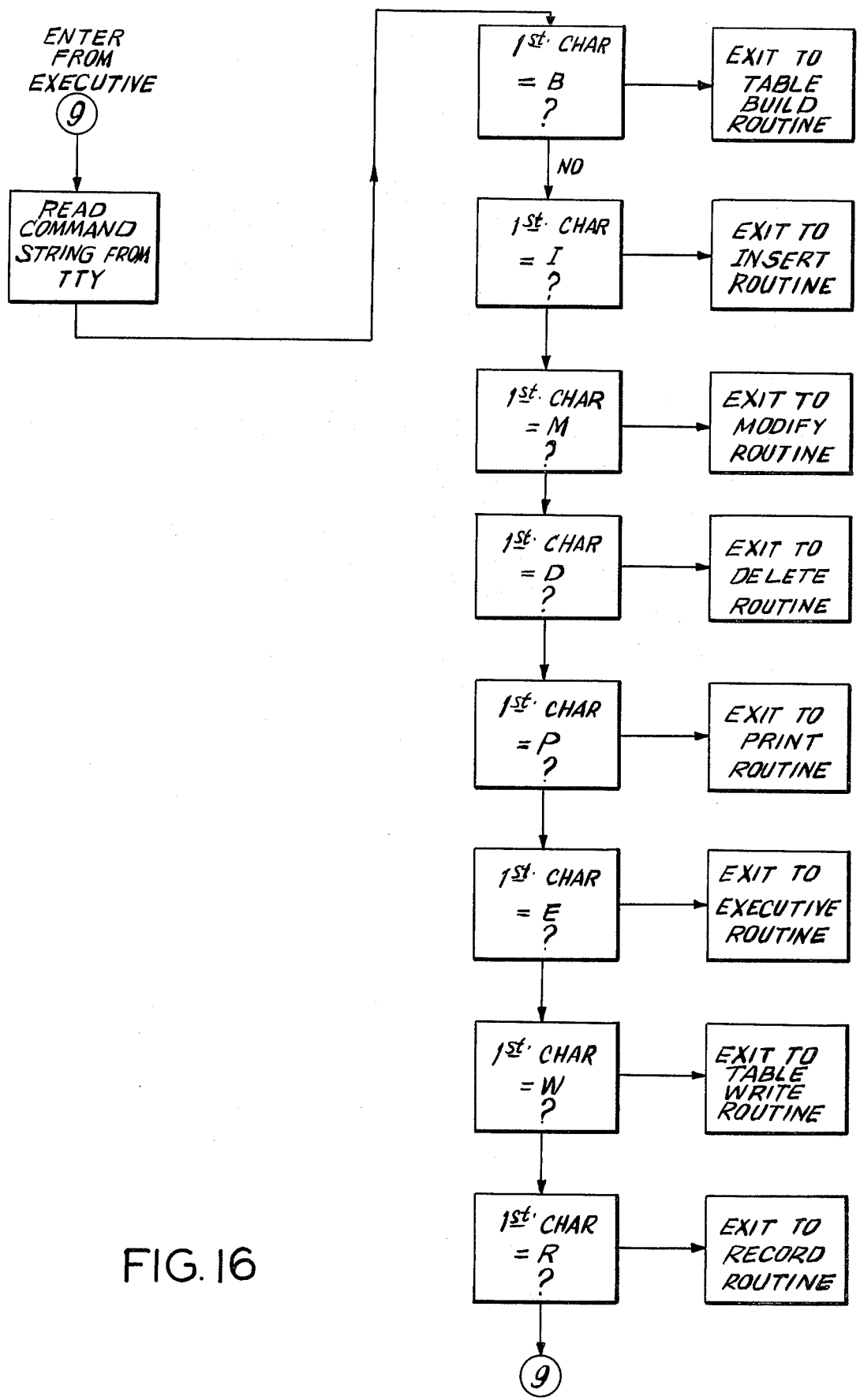
FIG. 16 is a flow chart of a teletype monitor subroutine for use in the dynamic fire simulator and trainer.
Figure 20:
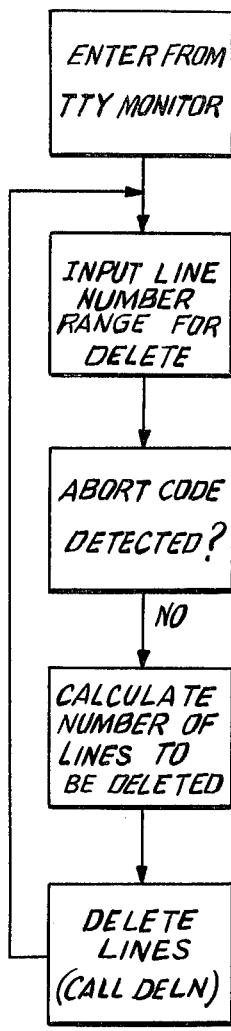
FIG. 20 is a flow chart of a delete table entry subroutine for use in the dynamic fire simulator and trainer.
Figure 17:
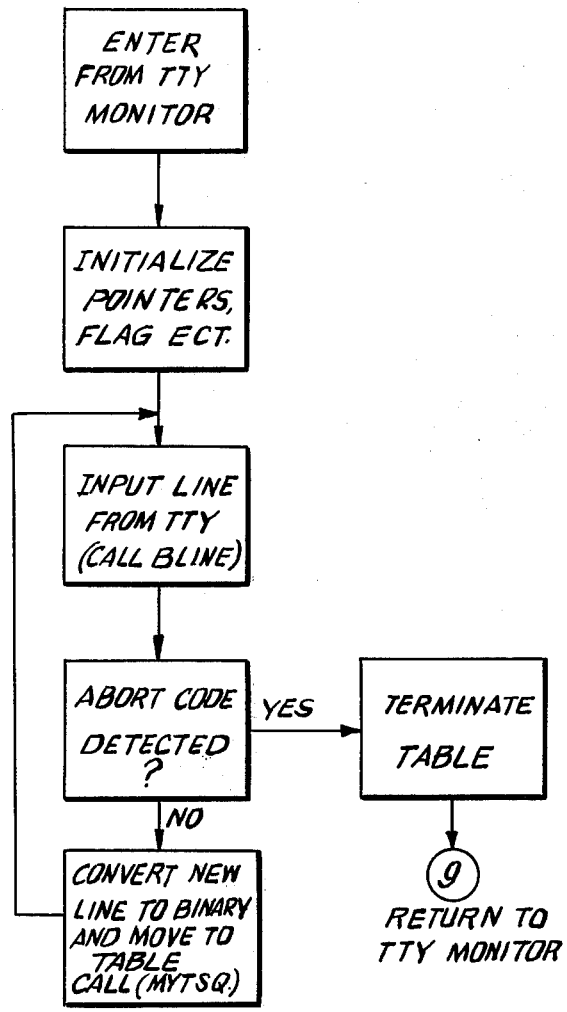
FIG. 17 is a flow chart of a table build subroutine for use in the dynamic fire simulator and trainer.
Figure 18:
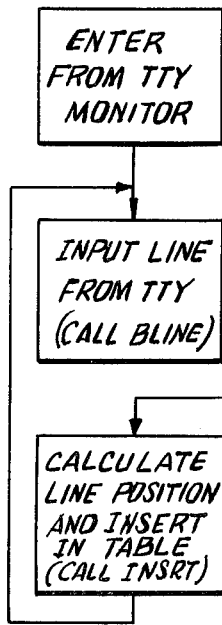
FIG. 18 is a flow chart of an insert line subroutine for use in the dynamic fire simulator and trainer.
Figure 19:
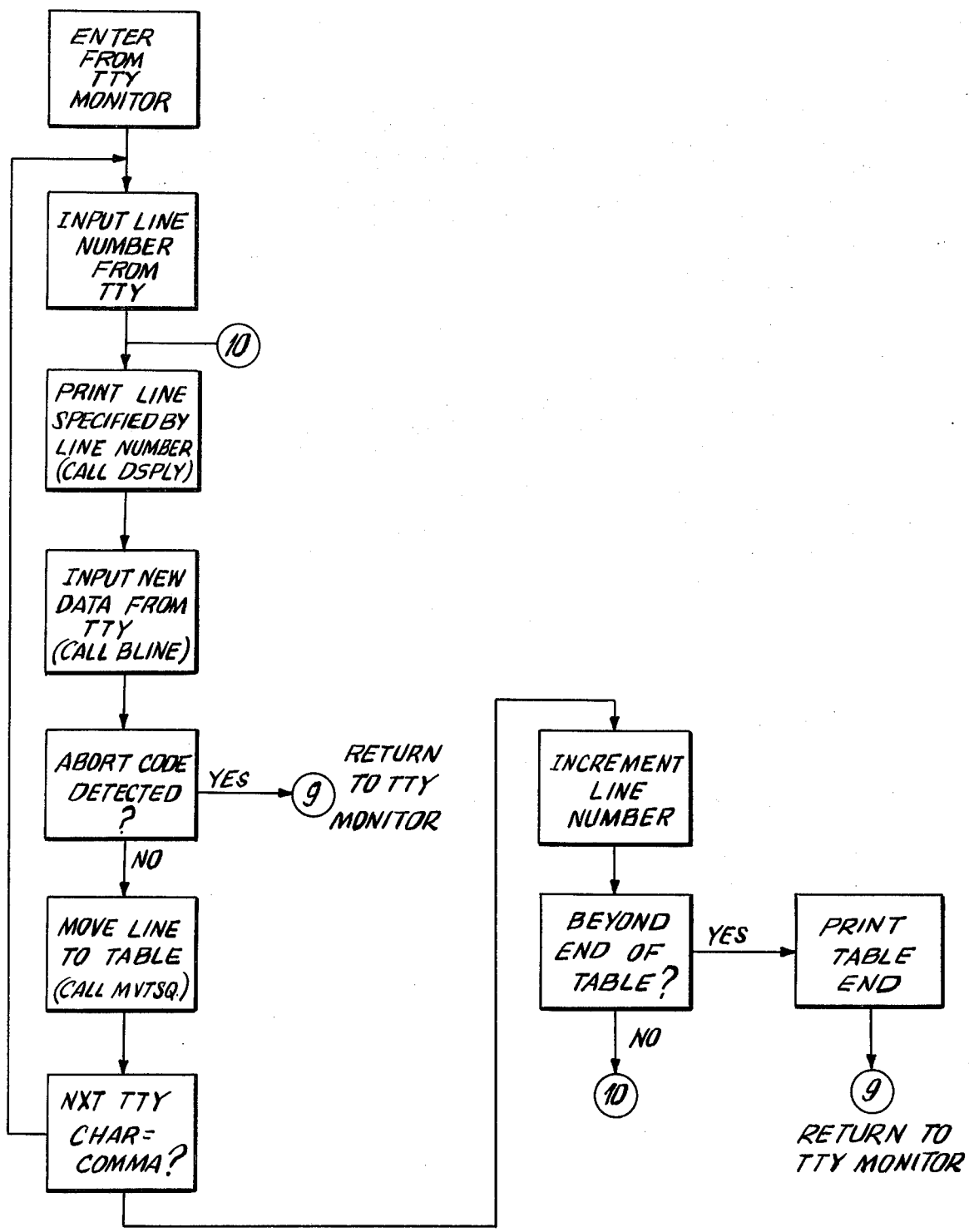
FIG. 19 is a flow chart of a modify table subroutine for use in the dynamic fire simulator and trainer.
Figure 21:
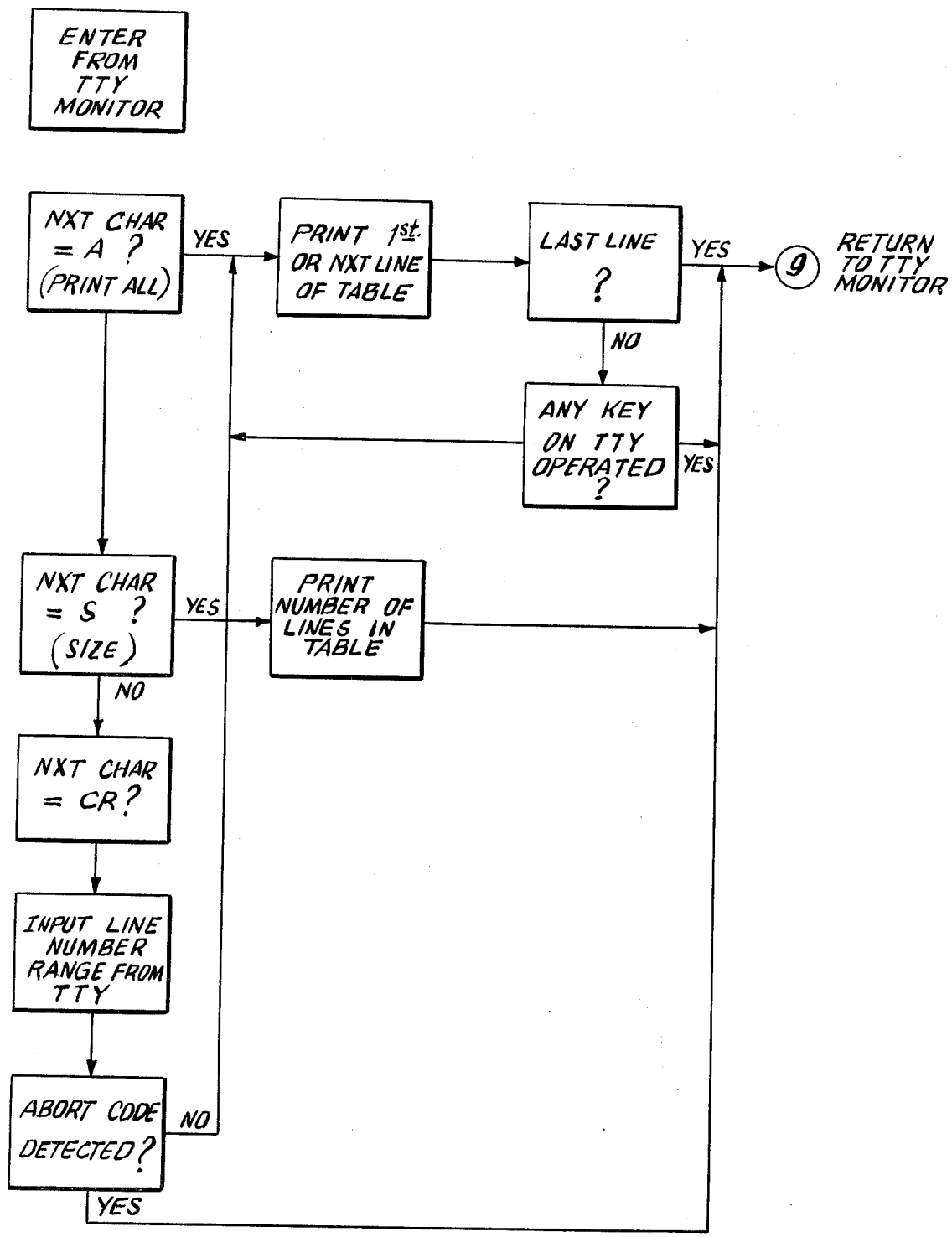
FIG. 21 is a flow chart of a print subroutine for use in the dynamic fire simulator and trainer.
Figure 22:
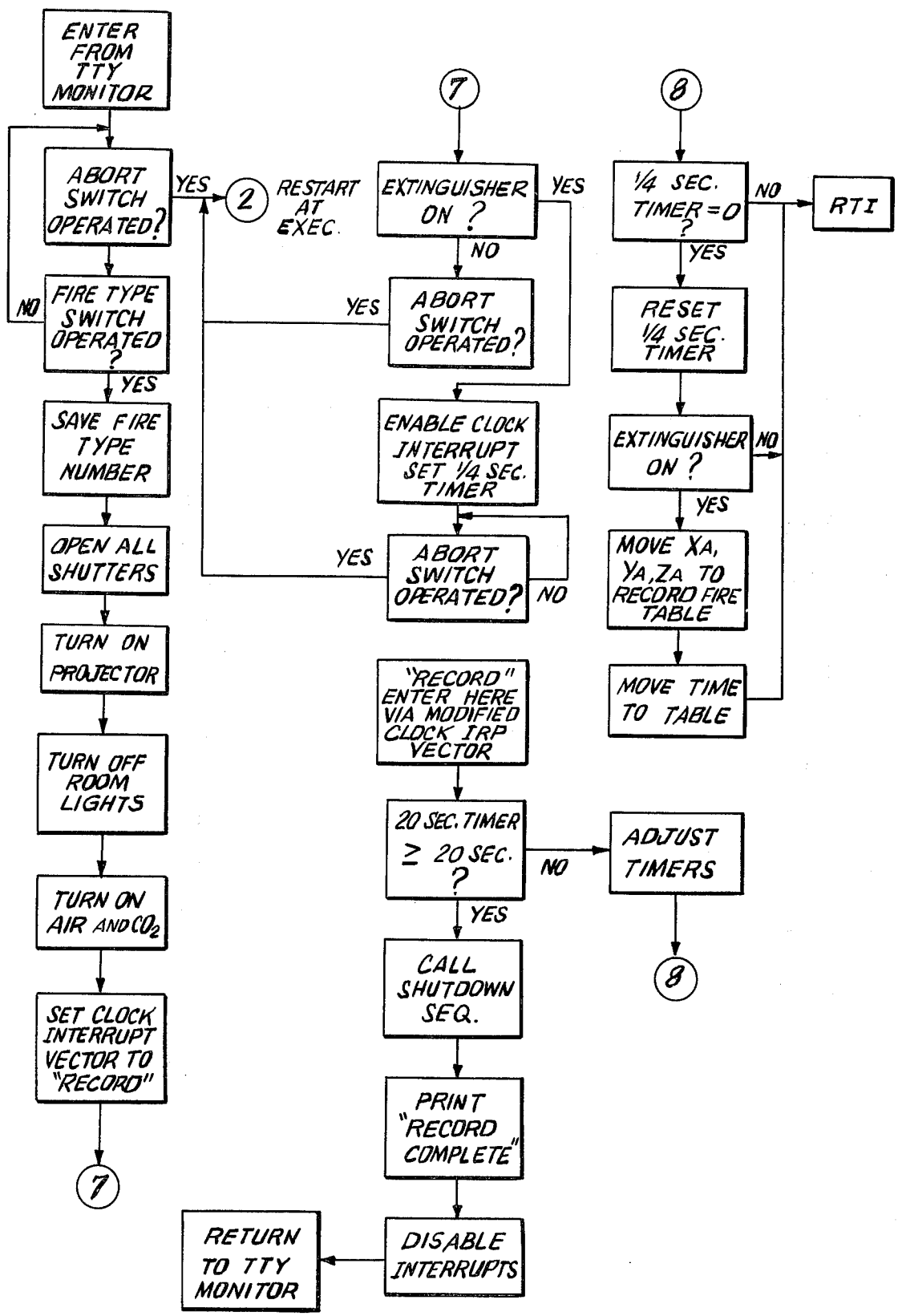
FIG. 22 is a flow chart of a record mode subroutine for use in the dynamic fire simulator and trainer.

Referring to FIG. 11, the controller 132 is shown as a functional block diagram. The controller 132 provides an interface between the computer 140 and a rear control panel 149 in the electronics control cabinet 43 for providing computer or manual (off-line) control of the components of the dynamic fire simulator and trainer 10.

The major sections of the controller 132 are the computer interface and system control 150, load cell data control 152, sound control 154, extinguisher control logic 156, heat control logic 158, shutter control logic 160, and projector power control 162.

The computer interface and system control 150 provides the I/O communication between the computer 140 and the controller 132. Coded instructions from the computer 140 are received at the computer I/O 164 and fed to the instruction decoder 166 for decoding. The decoded instructions are fed to the storage 168 for use by the controller 132. These stored instructions control the dynamic fire simulator and trainer 10 when a manual or computer select circuit 170 is in the computer mode of operation, as determined by a switch on the front control panel 15. An identical switch is located on the rear control panel 149 in the electronic control cabinet 43, see FIG. 2. If the manual mode is selected, the dynamic fire simulator and trainer 10 is manually controlled from the rear control panel 149 and the instructions from the computer 140 are ignored.

A clock 174 in the form of a 4.0 MHz crystal controlled oscillator provides timing signals for the computer 140 and the load cell data control 152. The four load cells 60 coupled to the screen 18 transmit D.C. voltages proportional to the applied force ($CO_2$ discharge). Each of the signals for the load cells 60 is amplified and transmitted to the controller 132, through a low pass filter 175 to remove high frequency noise and then fed to an analog multiplexer 176. Under control of the clock 174 the analog multiplexer 176 sequentially transmits each of the load cell signals to an A/D converter 178 where the signals are converted to a 7 bit digital value. These digital values are transmitted to storage 180. In response to computer data input signals from computer 140, the manual or computer select circuit 170 activates a digital multiplexer 182 for transmitting information from certain portions of the storage 180 to the computer 140 which determines the point of impact of the $CO_2$ discharge on the screen 18, and determines therefore the accuracy of the actual on-line fire fighting technique employed by the trainee 14.

The sound level is controlled by the computer 140 or manually from rear control panel 149 via the manual or computer select circuit 170. Signals representing the sound level are transmitted into the sound control 154 from the tape deck 144. The sound control 154 includes a variable gain amplifier for controlling the volume of the sound (sound signal amplitude). This conditioned signal is transmitted to sound amplifier 146 and then to loudspeaker 148.

The fire extinguisher 20 is controlled by the rear control panel 149 or by the computer 140. Upon receiving a signal from the charge lever switch 124, the computer 140 energizes the solenoid valve 128 through extinguisher control logic 156. Thereafter, upon closing of the nozzle switch 126 a signal is applied to the extinguisher control logic 156 and to the computer 140. The computer 140 begins to count time, e.g., a period of 15 seconds may be allotted for the trainee 14 to complete a fire fighting sequence. After the allotted time period, the solenoid valve 128 is de-energized to prevent discharge of the $CO_2$ from the nozzle 26.

The heater door assembly 83 can be controlled by the rear control panel 149 or the computer 140 via the manual or computer select circuit 170. The heater control logic 158 receives the appropriate signals from the manual or computer select circuit 170 and makes the appropriate connection to the negative supply for activating the heater door assembly 83.

```
000262 032701          BIT     #1,R1          ;BR=YES
       000001
000266 001003          BNE     EX6
                ;
000270 004767          JSR     PC,STPTST
       000140

000274 000773          BR      EX5
                ;
000276 012737 EX6:     MOV     #CO2STR,@#INFCMD ;CO2 TO ON
       114001
       167772
                ;
000304 004767 EX7:     JSR     PC,STPTST
       000124
                ;
000310 032701          BIT     #1,R1          ;EXTINGUSHER ON ?
       000001
000314 001773          BEQ     EX7            ;BR=NO
000316 004267          JSR     R0,CLKSET
       000300
000322 000010'         .WORD   TB15           ;PNTS TO 2-WRD 15 SEC TIMERBLK
000324 004367          JSR     R0,CLKSET
       000272
000330 000014'         .WORD   TB10           ;BLK FOR 10 SEC TIMER
000332 004067          JSR     R0,TMSTRT      ;ENABLE TIMER INRPT
       000176
                ;
                ;       ENTER MAIN EXECUTION LOOP
                ;
                ;
                ;       SHUTDOWN SEQUENCE
                ;
       100000 HOTOFF=100000
       104000 SNDOFF=104000
       074000 PJSHUT=074000
       114000 CO2STP=114000
       134000 RESETS=134000
                ;
000336 012737 SHUTDN:  MOV     #RESETS,@#INFCMD  ;SYS RESET
       134000
       167772
000344 004767          JSR     PC,DELY
       000052
000350 012737          MOV     #SNDOFF,@#INFCMD  ;SOUND OFF
       104000
       167772
000356 004767          JSR     PC,DELY
       000040
000362 012737          MOV     #PJSHUT,@#INFCMD  ;CLSE PROJ SHUTTERS
       074000
       167772
000370 004767          JSR     PC,DELY
       000026
000374 012737          MOV     #CO2STP,@#INFCMD  ; CO2 OFF
       114000
       167772
000402 004767          JSR     PC,DELY
       000014
000406 012737          MOV     #HOTOFF,@#INFCMD  ; HEAT SHUTTERS CLS
       100000
       167772
000414 004767          JSR     PC,DELY
       000002
000420 000207          RTS     PC
                ;
000422 012701 DELY:    MOV     #100.,R1       ; DELAY LOOP TO ALLOW
       000144
000426 005301 DELOOP:  DEC     R1             ; HDWRE RESPONSE
000430 001376          BNE     DELOOP
000432 000207          RTS     PC
000434 012737 STPTST:  MOV     #STAT1,@#INFCMD   ;GET STATUS1
       004001
       167772
```

```
000442 013701 STPL:    MOV    @#INFST,R1
       167774
000446 042701          BIC    #0017777,R1
       017777
000452 022701          CMP    #020000,R1
       020000
000456 001371          BNE    STPL
000460 013701          MOV    @#INFST,R1
       167774
000464 032701          BIT    #40,R1              ;STOP SW ON?
       000040
000470 001403          BEQ    STEX                ;BR=NO
000472 005726          TST    (R6)+               ;SHUTDOWN
000474 000167          JMP    EXEC1
       177330
                  ;
000500 000207 STEX:    RTS    PC
                  ;
000502 012737 GSTAT2:  MOV    #STAT2,@#INFCMD
       004007
       167772
000510 013701 GS2:     MOV    @#INFST,R1
       167774
000514 042701          BIC    #017777,R1
       017777
000520 022701          CMP    #160000,R1
       160000
000524 001371          BNE    GS2
                  ;
000526 013701          MOV    @#INFST,R1
       167774
000532 000207          RTS    PC
                  ;
                  ;    JSR    R0,TMSTRT           START UP ANY
                  ;                               CLOCKS SET BY CLKSET CALLS
000534 012767 TMSTRT:  MOV    #CLOKIN,CLKV
       000560
       000100
000542 012767'         MOV    #100,LKS            ;ENABLE CLOCK
       000100
       177546
000550 012767'         MOV    #240,PSW            ;LEVEL 5 FOR CLOCK
       000240
       177776
000556 000200          RTS    R0
                  ;    CATCH 60 CYCLE INTERRUPTS HERE
                  ;
000560 010046 CLOKIN:  MOV    R0,-(SP)
000562 012700'         MOV    #CLKPNT,R0
       000006
000566 005710          TST    (R0)
000570 001412          BEQ    END60
000572 011000 NXTPTR:  MOV    (R0),R0
000574 005200          INC    R0
000576 005200          INC    R0
000600 005710          TST    (R0)
000602 001401          BEQ    SKPZ
000604 005310          DEC    (R0)                ;DEC TIMER CELL
       000606 SKPZ=.
000606 005300          DEC    R0
000610 005300          DEC    R0
000612 005710          TST    (R0)
000614 001366          BNE    NXTPTR
000616 012600 END60:   MOV    (SP)+,R0
000620 000002          RTI
                  ;
                  ;    JSR    R0,CLKSET           SET UP A 60 CPS COUNTER
                  ;    .WORD                      POINTER TO 2-WRD CLOCK BLOCK
                  ;    RETURN
                  ;                               AS MANY OF THESE AS NEEDED MAY BE SET UP
                  ;
                  ;CLKBLK: .WORD  0               DO NOT TOUCH THIS WORD
                  ;        .WORD  N               N=YOUR CLOCK VALUE WHICH WILL
                  ;                               BE DECREMENTED 60 TIMES PER
                  ;                                  SECOND
```

```
                .GLOBL   ASCTBN,BNTASC,NEWLN
                .GLOBL   BLINE,AC,BLANK,COMMA,COUNT,CR,DIV,ERR
                .GLOBL   LF,LINE,LINEA,LINEND,LINIST,MQ,MSGOUT
                .GLOBL   MVB,NFLDS,SLNG,FLDLNG,NEWLN
                .GLOBL   SQTBL,SQTBLA,TTLNS,TTS,TTYN,TTYOUT
                .GLOBL   CLKSET,GTLNUM,CHRN,STPTST,DELETE,MUL
                .GLOBL   TMSTRT,GETS1,GETS2,XAXIS,RECORD,EXEC
                .GLOBL   TBLBLD,INSERT,MODIFY,PRINT,WRITE,TTYMON
                .GLOBL   PSW,LKS,FTD,CRECRD,XSIZE,YSIZE
    167774 INFST=        167774        ;DR11 STATUS WORD
    167772 INFCMD=       167772        ;DR11 COMMAND WORD
    000006 R6=%6
    000007 PC=%7
    000000 INTLST=.                    ;ALL FLAGS HERE TO ENDFLG WILL BE ZEROED
               ;                        UPON INIT.
000000 000000 COLCNT:    .WORD    0
000002 000000 LINEA:     .WORD    0
000004 000000 SQTBLA:    .WORD    0
000006 000000 CLKPNT:    .WORD    0
000010 000000 TB15:      .WORD    0
000012 000000 TMR15:     .WORD    0

000014 000000 TB10:      .WORD    0
000016 000000 TMR10:     .WORD    0
000020 000000 ERR:       .WORD    0
       000022 ENDFLG=.
       000006 XSIZE=006
       000010 YSIZE=010
       000100 CLKV=100
       177546 LKS=177546
       177776 PSW=177776
       177560 TKS=177560
       177562 TKB=177562
       177564 TPS=177564
       177566 TPB=177566
       004001 STAT1=004001
       004007 STAT2=004007
               ;
       004006 RQFTYP=004006
               ;
       004002 REQA=004002
       004003 REQB=004003
       004004 REQC=004004
       004005 REQD=004005
       100003 HOTFUL=100003
       104003 SNDFUL=104003
       070001 PRJFUL=070001
       114001 CO2STR=114001
               ;
               ;  CORE STORAGE
               ;
000022 000000 LINE:      .WORD    0           ; CURRENT TABLE LINE# - 1
000024 000000 TTLNS:     .WORD    0           ; TOTAL # LINES IN TABLE
000026 000000 COUNT:     .WORD    0
               ;
               ;          ANSUL SYSTEM EXECUTIVE ENTRY POINT
               ;
000030 012737 EXEC1:     MOV      #340,@#PSW
       000340
       177776
000036 012706            MOV      #600,SP     ;SET STACK
       000600
000042 012701'           MOV      #ENDFLG,R1  ;PAL MAY NOT (PROBABLY)
       000022
000046 012700'           MOV      #INTLST,R0  ;VERSTEHEN COMPOUND ARGS
       000000
000052 160001            SUB      R0,R1       ;R1= # OF CELLS-1 ALL *2
000054 005020 CLRFLG:    CLR      (R0)+       ;CLEAR FLAGS LOOP
000056 005301            DEC      R1
000060 005301            DEC      R1
000062 003374            BGT      CLRFLG
000064 000167            JMP      LOCTST      ;DEBUG-SKIP CODE FOR TEST ONLY
       000022
000070 004767            JSR      PC,SHUTDN
```

```
         000242
         000074 EXEC=.
000074   012706          MOV     #600,SP
         000600
                 ;
         000100 TTYTST=.
000100   105737          TSTB    @#TKS           ;TTY INPUT WAITING?
         177560
000104   100002          BPL     LOCTST          ;BR=NO
000106   000167          JMP     TTYMON
         001672
000112   012737 LOCTST:  MOV     #STAT1,@#INFCMD ;REQUEST STATUS 1
         004001
         167772
000120   013701 LCT:     MOV     @#INFST,R1
         167774
000124   042701          BIC     #017777,R1
         017777
000130   022701          CMP     #020000,R1      ;READY?
         020000
000134   001371          BNE     LCT             ;BR=NO
000136   013701          MOV     @#INFST,R1
         167774
000142   042701          BIC     #177000,R1
         177000
                 ;
000146   032737          BIT     #100,@#INFCMD   ;LOCAL MODE?
         000100
         167772
000154   001351          BNE     TTYTST          ;BR=YES
                 ;
000156   032737          BIT     #40,@#INFCMD
         000040
         167772
000164   001745          BEQ     TTYTST          ;BR=NO
                 ;
000166   012737          MOV     #RQFTYP,@#INFCMD ;REQUEST FIRE TYPE
         004006
         167772
                 ;
000174   004767          JSR     PC,FVAL         ;INSURE FIRE TBL IN CORE
         002046
                                                 ;AND INITIALIZE
                 ;
000200   004767 FLSL:    JSR     PC,STPTST       ;STOP SWITCH ON ?
         000230
                 ;
000204   032701          BIT     #20,R1          ;NO, FIRE SWITCH ON ?
         000020
000210   001773          BEQ     FLSL            ;BR=NO
                 ;
000212   032701          BIT     #200,R1         ;CO2 PRES GOOD ?
         000200
000216   001770          BEQ     FLSL            ;BR=NO
000220   012737          MOV     #HOTFUL,@#INFCMD
         100003
         167772
000226   004767          JSR     PC,DELY
         000170
                 ;
000232   012737          MOV     #SNDFUL,@#INFCMD
         104003
         167772
000240   004767          JSR     PC,DELY
         000156
                 ;
000244   012737          MOV     #PRJFUL,@#INFCMD
         070001
         167772
000252   004767          JSR     PC,DELY
         000144
                 ;
000256   004767 EX5:     JSR     PC,GSTAT2       ;CHARGE LEVER ON ?
         000220
```

```
000262 032701          BIT     #1,R1           ;BR=YES
       000001
000266 001003          BNE     EX6
                ;
000270 004767          JSR     PC,STPTST
       000140

000274 000773          BR      EX5
                ;
000276 012737 EX6:     MOV     #CO2STR,@#INFCMD ;CO2 TO ON
       114001
       167772
                ;
000304 004767 EX7:     JSR     PC,STPTST
       000124
                ;
000310 032701          BIT     #1,R1           ;EXTINGUSHER ON ?
       000001
000314 001773          BEQ     EX7             ;BR=NO
000316 004067          JSR     R0,CLKSET
       000300
000322 000010'         .WORD   TB15    ;PNTS TO 2-WRD 15 SEC TIMERBLK
000324 004067          JSR     R0,CLKSET
       000272
000330 000014'         .WORD   TB10    ;BLK FOR 10 SEC TIMER
000332 004067          JSR     R0,TMSTRT       ;ENABLE TIMER INRPT
       000176
                ;
                ;       ENTER MAIN EXECUTION LOOP
                ;
                ;
                ;       SHUTDOWN SEQUENCE
                ;
       100000 HOTOFF=100000
       104000 SNDOFF=104000
       074000 PJSHUT=074000
       114000 CO2STP=114000
       134000 RESETS=134000
                ;
000336 012737 SHUTDN:  MOV     #RESETS,@#INFCMD        ;SYS RESET
       134000
       167772
000344 004767          JSR     PC,DELY
       000052
000350 012737          MOV     #SNDOFF,@#INFCMD        ;SOUND OFF
       104000
       167772
000356 004767          JSR     PC,DELY
       000040
000362 012737          MOV     #PJSHUT,@#INFCMD        ;CLSE PROJ SHUTTERS
       074000
       167772
000370 004767          JSR     PC,DELY
       000026
000374 012737          MOV     #CO2STP,@#INFCMD        ; CO2 OFF
       114000
       167772
000402 004767          JSR     PC,DELY
       000014
000406 012737          MOV     #HOTOFF,@#INFCMD        ; HEAT SHUTTERS CLS
       100000
       167772
000414 004767          JSR     PC,DELY
       000002
000420 000207          RTS     PC
                ;
000422 012701 DELY:    MOV     #100.,R1        ; DELAY LOOP TO ALLOW
       000144
000426 005301 DELOOP:  DEC     R1              ; HDWRE RESPONSE
000430 001376          BNE     DELOOP
000432 000207          RTS     PC
000434 012737 STPTST:  MOV     #STAT1,@#INFCMD ;GET STATUS1
       004001
       167772
```

```
000442 013701 STPL:    MOV     @#INFST,R1
       167774
000446 042701          BIC     #0017777,R1
       017777
000452 022701          CMP     #020000,R1
       020000
000456 001371          BNE     STPL
000460 013701          MOV     @#INFST,R1
       167774
000464 032701          BIT     #40,R1              ;STOP SW ON?
       000040
000470 001403          BEQ     STEX                ;BR=NO
000472 005726          TST     (R6)+               ;SHUTDOWN
000474 000167          JMP     EXEC1
       177330
                ;
000500 000207 STEX:    RTS     PC
                ;
000502 012737 GSTAT2:  MOV     #STAT2,@#INFCMD
       004007
       167772
000510 013701 GS2:     MOV     @#INFST,R1
       167774
000514 042701          BIC     #017777,R1
       017777
000520 022701          CMP     #160000,R1
       160000
000524 001371          BNE     GS2
                ;
000526 013701          MOV     @#INFST,R1
       167774
000532 000207          RTS     PC
                ;
                ;       JSR     R0,TMSTRT           START UP ANY
                ;                                   CLOCKS SET BY CLKSET CALLS
000534 012767 TMSTRT:  MOV     #CLOKIN,CLKV
       000560
       000100
000542 012767'         MOV     #100,LKS            ;ENABLE CLOCK
       000100
       177546
000550 012767'         MOV     #240,PSW            ;LEVEL 5 FOR CLOCK
       000240
       177776
000556 000200          RTS     R0
                ;       CATCH 60 CYCLE INTERRUPTS HERE
                ;
000560 010046 CLOKIN:  MOV     R0,-(SP)
000562 012700'         MOV     #CLKPNT,R0
       000006
000566 005710          TST     (R0)
000570 001412          BEQ     END60
000572 011000 NXTPTR:  MOV     (R0),R0
000574 005200          INC     R0
000576 005200          INC     R0
000600 005710          TST     (R0)
000602 001401          BEQ     SKPZ
000604 005310          DEC     (R0)                ;DEC TIMER CELL
000606 SKPZ=.
000606 005300          DEC     R0
000610 005300          DEC     R0
000612 005710          TST     (R0)
000614 001366          BNE     NXTPTR
000616 012600 END60:   MOV     (SP)+,R0
000620 000002          RTI
                ;
                ;       JSR     R0,CLKSET           SET UP A 60 CPS COUNTER
                ;       .WORD                       POINTER TO 2-WRD CLOCK BLOCK
                ;       RETURN
                ;                                   AS MANY OF THESE AS NEEDED MAY BE SET UP
                ;
                ;CLKBLK: .WORD  0                   DO NOT TOUCH THIS WORD
                ;        .WORD  N                   N=YOUR CLOCK VALUE WHICH WILL
                ;                                   BE DECREMENTED 60 TIMES PER
                ;                                       SECOND
```

```
000622 010146 CLKSET:  MOV    R1,-(SP)
000624 012701'         MOV    #CLKPNT,R1
       000006
000630 005711 NOTT:    TST    (R1)
000632 001402          BEQ    IZNOTT
000634 011101          MOV    (R1),R1
000636 000774          BR     NOTT
000640        IZNOTT=.
000640 012011          MOV    (R0)+,(R1)
000642 005031          CLR    @(R1)+  ;SERVES TO FLAG END CHAIN
000644 012601          MOV    (SP)+,R1
000646 000200          RTS    R0
       ;
       ;
       ;
000650 120127 DUMB:    CMPB   R1,#54    ;COMMA?
       000054
000654 001402          BEQ    DUPE      ;BR=YES
000656 000167 DUM:     JMP    ENDFLD
       000530
000662 005704 DUPE:    TST    R4        ;BGNNG OF FLD?
000664 001374          BNE    DUM       ;BR=NO, DONT DUPE
000666 020427 DUPE1:   CMP    R4,#4     ;COPY FLD
       000004
000672 001405          BEQ    DUPE2
000674 112301          MOVB   (R3)+,R1
000676 004767          JSR    PC,TTYOUT
       001030
000702 005204          INC    R4
000704 000770          BR     DUPE1
000706 112701 DUPE2:   MOVB   #COMMA,R1
       000054
000712 004767          JSR    PC,TTYOUT
       001014
000716 000464          BR     BUMPF
       ;
000720 000000 TMTL:    0;
       ; BUILD SEQUENCE TABLE LINE FROM TTY I/P
       ;
       ;      CALLED VIA JSR PC FROM TBLBLD, INSERT, MODIFY
       ;
000722 005005 BLINE:   CLR    R5              ;CLR FLDCNT
       ;
000724 005004 NXTFLD:  CLR    R4              ;CLR COLCNT
000726 010502          MOV    R5,R2           ;GET FLDCNT
000730 006302          ASL    R2              ;MULTIPLY BY 2
000732 016203'         MOV    NDXTBL(R2),R3   ;ADR TO MOVE 1ST BYTE
       001450
000736 062703'         ADD    #NEWLN,R3
       000000
000742 004567'MORE:    JSR    R5,CHRN         ;GET CHR IN R1
       000000
000746 000425          BR     NUMMER          ;IS DIGIT
000750 000737          BR     DUMB
000752 005767 LNTRM:   TST    LINE            ;HERE IF CR
       177044
000756 001413          BEQ    NODUPE
       ;
000760 004767 ENDIT:   JSR    PC,BLKFL
       000444
000764 112701 NOMORE:  MOVB   #CR,R1
       000015
000770 004767          JSR    PC,TTYOUT
       000736
000774 112701          MOVB   #LF,R1
       000012
001000 004767          JSR    PC,TTYOUT
       000726
001004 000207          RTS    PC
001006 020527 NODUPE:  CMP    R5,#NDXSZ
       000007
001012 001353          BNE    MORE
001014 005704          TST    R4              ;COLCNT = 0 ?
001016 001751          BEQ    MORE            ;BR=NO
```

```
001020 000757            BR       ENDIT
001022 005204  NUMMER:   INC      R4
001024 022704            CMP      #5,R4
       000005
001030 001404            BEQ      CHOP              ;BR=YES
001032 110123  BRBK:     MOVB     R1,(R3)+
001034 004767            JSR      PC,TTYOUT
       000672
001040 000740            BR       MORE
               ;BACKUP FLD BY ONE BYTE
001042 005304  CHOP:     DEC      R4
001044 005303            DEC      R3
001046 116363            MOVB     -2(R3),-3(R3)
       177776
       177775
001054 116363            MOVB     -1(R3),-2(R3)
       177777
       177776
001062 111363            MOVB     (R3),-1(R3)
       177777
001066 000761            BR       BRBK
001070 005205  BUMPF:    INC      R5                ;BUMP FLDCNT
001072 020527            CMP      R5,#NDXSZ         ;LAST FLD ?
       000007
001076 001312            BNE      NXTFLD
               ;    TTY INPUT IS BEING ACCEPTED HERE TO BUILD
               ;    A CODED COMMAND EXECUTION LINE WHICH WILL
               ;    (1) OPEN/CLOSE ANY ONE OR ALL SHUTTERS AND/OR
               ;    (2) SET HEAT AND/OR SOUND LEVEL
               ;    THIS COMMAND WORD IS THE LAST WORD OF THE
               ;    "NEWLN" BFR
001100 004767  ETTY:     JSR      PC,TTYN
       000642
001104 004767            JSR      PC,TTYOUT
       000622
001110 122701            CMPB     #110,R1
       000110
001114 001424            BEQ      SETHT     ;IF H
001116 122701            CMPB     #123,R1
       000123
001122 001434            BEQ      SETS      ;IF S
001124 122701            CMPB     #117,R1
       000117
001130 001447            BEQ      OPS       ;IF O
001132 122701            CMPB     #103,R1
       000103
001136 001450            BEQ      CLS       ;IF C
001140 122701            CMPB     #CR,R1
       000015
001144 001707            BEQ      NOMORE
001146 122701            CMPB     #COMMA,R1
       000054
001152 001752            BEQ      ETTY
001154 012701            MOV      #077,R1
       000077
001160 004767  COMSEP:   JSR      PC,TTYOUT
       000546
001164 000745            BR       ETTY
001166 152763  SETHT:    BISB     #100,1(R3)        ;SET HTR FLG
       000100
       000001
001174 004567            JSR      R5,OBTAIN
       000152
001200    063            .BYTE    063,060
001201    060
001202 162701            SUB      #60,R1
       000060
001206 150163            BISB     R1,1(R3)
       000001
001212 000732            BR       ETTY
001214 152763  SETS:     BISB     #200,1(R3)        ;SOUND LEVEL
       000200
       000001
```

```
001222 004567         JSR      R5,OBTAIN
       000124
001226   063          .BYTE    063,060
001227   060
001230 162701         SUB      #60,R1
       000060
001234 006101         ROL      R1
001236 006101         ROL      R1
001240 006101         ROL      R1
001242 150163         BISB     R1,1(R3)
       000001
001246 000714         BR       ETTY
001250 152763  OPS:   BISB     #200,1(R3)     ;OPEN SHUTTER(S)
       000200
       000001
001256 000403         BR       GETSN
001260 152763  CLS:   BISB     #100,1(R3)     ;CLOSE
       000100
       000001
001266 004567  GETSN: JSR      R5,OBTAIN
       000060
001272   111          .BYTE    111,101
001273   101
001274 162701         SUB      #101,R1
       000101
001300 126701         CMPB     8.,R1
       000010
001304 001005         BNE      NOTALL
001306 142713         BICB     #77,(R3)       ;LTR J INPUT=ALL SHUTTER
       000077
001312 152713         BISB     #1,(R3)
       000001
001316 000622         BR       NOMORE
001320 142713  NOTALL: BICB    #77,(R3)
       000077
001324 150113         BISB     R1,(R3)
001326 004567         JSR      R5,OBTAIN
       000020
001332   064          .BYTE    064,060
001333   060
001334 162701         SUB      #60,R1
       000060
001340 006101         ROL      R1
001342 006101         ROL      R1
001344 006101         ROL      R1
001346 150113         BISB     R1,(R3)
001350 000653         BR       ETTY
       ;               OBTAIN A CHR VIA TTY WHICH FALLS IN LIMITS
       ;               SPECIFIED IN HI/LO VALUE BYTES IN ARG WORD
       ;               JSR      R5,OBTAIN
       ;               .WORD    BYTEARGS
001352 004767  OBTAIN: JSR     PC,TTYN
       000370
001356 120115         CMPB     R1,(R5)
001360 003007         BGT      NDG
001362 120165         CMPB     R1,1(R5)
       000001
001366 002404         BLT      NDG
001370 004767         JSR      PC,TTYOUT
       000336
001374 005725         TST      (R5)+
001376 000205         RTS      R5
001400 112701  NDG:   MOVB     #077,R1
       000077
001404 004767         JSR      PC,TTYOUT
       000322
001410 000760         BR       OBTAIN
001412 004767  ENDFLD: JSR     PC,BLKFL
       000012
001416 112723         MOVB     #COMMA,(R3)+
       000054
001422 004767         JSR      PC,TTYOUT
       000304
001426 000620         BR       BUMPF
```

```
                ;
                ;           FILL REMAINDER OF FLD W/BLANKS
001430 020427  BLKFL:  CMP     R4,#4
       000004
001434 002004          BGE     GOBACK
001436 005204          INC     R4
001440 112723          MOVB    #BLANK,(R3)+    ;STO BLNK
       000040
001444 000771          BR      BLKFL
001446 000207  GOBACK: RTS     PC
                ;          CONTAINS BYTE ADR OF LEADING EDGE OF EACH FLD
001450                 .EVEN
001450 000000  NDXTBL: .WORD   0
001452 000005          .WORD   XAXIS
001454 000012          .WORD   YAXIS
001456 000017          .WORD   ZAXIS
001460 000024          .WORD   RESOL
001462 000031          .WORD   MINTM
001464 000036          .WORD   MAXTM
       000007  NDXSZ=7                 ; # ITEMS
                ;
                ; DELETE SPECIFIED LINES IN SEQ TABLE
                ;
                ;
001466 004767  DELETE: JSR     PC,GTLNUM       ;LINE=1ST LINE TO DELETE
       000000
001472 016767          MOV     LINE,DLINE
       176324
       000016
001500 004767          JSR     PC,GTLNUM       ;LINE=NUM OF LINES TO
       000000                                  ; DELETE
001504 016767          MOV     LINE,DCNT
       176312
       000006
                ;
001512 004567          JSR     R5,DELN
       000006
001516 000000  DLINE:  .WORD   0
001520 000000  DCNT:   .WORD   0
                ;
001522 000207          RTS     PC              ;EXIT
                ; DELETE ONE OR MORE LINES FROM SEQUENCE TABLE
                ;      JSR     R5
                ;      .WORD   BEGINNG LINE# FOR DELETE
                ;      .WORD   # LINES TO DELETE
                ;
001524 016501  DELN:   MOV     2(R5),R1        ;#LINES
       000002
001530 001455          BEQ     DELEX
001532 021567          CMP     @R5,TTLNS       ; WITHIN TABLE ?
       176266
001536 003052          BGT     DELEX           ; BR=NO
                ;
001540 011502          MOV     @R5,R2          ; CALC LAST LINE FOR DELEZ
001542 060102          ADD     R1,R2
                ;
001544 026702          CMP     TTLNS,R2        ; OFF THE TABLE ?
       176254
001550 002006          BGE     DEL1            ; BR=NO
                ;
001552 016701          MOV     TTLNS,R1        ; ADJ # LINES IN R1
       176246
001556 161501          SUB     @R5,R1
001560 005201          INC     R1
001562 010165          MOV     R1,2(R5)        ; SAVE #LINES DELETED
       000002
                ;
001566 012737  DEL1:   MOV     #SLNG,@#MQ      ; LINE LENGTH
       000016
       177304
001574 010237          MOV     R2,@#MUL        ; TIMES #LINES
       177306
                ;
```

```
001600 013703          MOV     @#MQ,R3      ; GIVING OFFSET TO 1ST
       177304
                                             ; LINE TO MOVE
                    ;
001604 012737          MOV     #SLNG,@#MQ   ; LINE LENGTH
       000016
       177304
001612 011537          MOV     @R5,@#MUL    ; TIMES 1ST LINE TO DELETE
       177306
                    ;
001616 013704          MOV     @#MQ,R4      ; GIVING OFFSET TO 1ST
       177304
                                             ;LINE TO OVERLAY
001622 066703          ADD     SQTBLA,R3
       176156
001626 066704          ADD     SQTBLA,R4    ;MAKE ABS ADDR
       176152
001632 061501          ADD     @R5,R1       ; BEGINNG LINE COUNT
                    ;
001634 012702 DEL3:    MOV     #SLNG,R2     ; MOVE 1 LINE
       000016
001640 112324 DEL2:    MOVB    (R3)+,(R4)+
001642 005302          DEC     R2
001644 001375          BNE     DEL2
                    ;
001646 005201          INC     R1           ; LAST LINE OF TABLE MOVED
001650 026701          CMP     TTLNS,R1
       176150
001654 002367          BGE     DEL3         ; BR=NO
                    ;
001656 166567          SUB     2(R5),TTLNS  ; ADJ LINE TOTAL
       000002
       176140
                    ;
001664 022525 DELEX:   CMP     (R5)+,(R5)+  ; BUMP FOR RETURN
001666 000205          RTS     R5
                    ;
                    ; PRINT MSGS
                    ;       JSR R5,MSGOUT
                    ;       .WORD   MSG ADR
                    ;
001670 012502 MSGOUT: MOV     (R5)+,R2
001672 005001          CLR     R1
001674 004767          JSR     PC,TTYOUT
       000032
001700 004767          JSR     PC,TTYOUT
       000026
001704 112201 MSG:    MOVB    (R2)+,R1
001706 004767          JSR     PC,TTYOUT
       000020
001712 122701          CMPB    #CR,R1
       000015
001716 001372          BNE     MSG
001720 012701          MOV     #LF,R1
       000012
001724 004767          JSR     PC,TTYOUT
       000002
001730 000205          RTS     R5
                    ; OUTPUT CHARACTER IN R1 TO TTY
                    ;
001732 105737 TTYOUT: TSTB    @#TPS
       177564
001736 100375          BPL     TTYOUT
001740 110137          MOVB    R1,@#TPB
       177566
001744 000207          RTS     PC

;
                    ; INPUT ONE CHARACTER FROM TTY
                    ;   CHARACTER IN R1, EXITS TO EXEC IF ABORT
                    ;
001746 105737 TTYN:   TSTB    @#TKS
       177560
001752 100375          BPL     TTYN
```

```
001754 113701          MOVB    @#TKB,R1
       177562
001760 042701          BIC     #177600,R1      ;CLEAR PARITY BIT
       177600
001764 120127          CMPB    R1,#SLASH       ; ABORT ?
       000057
001770 001401          BEQ     EXECA           ; BR=YES
001772 000207          RTS     PC
001774 004767 EXECA:   JSR     PC,TTYOUT
       177732
                       ;
002000 000167          JMP     EXEC
       176070
                       ;
002004 004767 TTYMON:  JSR     PC,FVAL
       000236
002010 004767          JSR     PC,CMDN
       000174
002014 012701          MOV     #72,R1
       000072
002020 004767          JSR     PC,TTYOUT
       177706
002024 004767          JSR     PC,CRLF
       000152
       002030 TTYIP=.
                       ;
002030 122702          CMPB    #102,R2
       000102
002034 001442          BEQ     TEX1            ; EXIT TO TABLE BUILD
                       ;
002036 122702          CMPB    #111,R2
       000111
002042 001441          BEQ     TEX2            ; EXIT TO INSERT
                       ;
002044 122702          CMPB    #115,R2
       000115
002050 001440          BEQ     TEX3            ; EXIT TO MODIFY
                       ;
002052 122702          CMPB    #104,R2
       000104
002056 001437          BEQ     TEX4            ; EXIT TO DELETE
                       ;
002060 122702          CMPB    #120,R2
       000120
002064 001436          BEQ     TEX5            ; EXIT TO PRINT
                       ;
002066 122702          CMPB    #105,R2
       000105
002072 001435          BEQ     TEX6            ; EXIT TO EXECUTIVE
                       ;
002074 122702          CMPB    #127,R2
       000127
002100 001434          BEQ     TEX7            ; EXIT TO TABLE WRITE
                       ;
002102 122702          CMPB    #122,R2
       000122
002106 001433          BEQ     TEX8            ; EXIT TO RECORD MODE
                       ;
002110 012701          MOV     #QUERY,R1       ; PRINT ? AND TRY
       000077
002114 004767          JSR     PC,TTYOUT       ; AGAIN
       177612
                       ;
002120 012701          MOV     #CR,R1
       000015
002124 004767          JSR     PC,TTYOUT
       177602
002130 012701          MOV     #LF,R1
       000012
002134 004767          JSR     PC,TTYOUT
       177572
002140 000721          BR      TTYMON
                       ;
```

```
002142 000167'TEX1:   JMP     TBLBLD
       000000
002146 000167'TEX2:   JMP     INSERT
       000000
002152 000167'TEX3:   JMP     MODIFY
       000000
002156 000167 TEX4:   JMP     DELETE
       177304
002162 000167'TEX5:   JMP     PRINT
       000000
002166 000167 TEX6:   JMP     EXEC
       175702
002172 000167'TEX7:   JMP     WRITE
       000000
002176 000167'TEX8:   JMP     RECORD
       000000
002202 012701 CRLF:   MOV     #CR,R1      ;ENTRY TO FORCE NEW LINE
       000015
002206 000402         BR      OPCR
002210 004767 CMDN:   JSR     PC,TTYN
       177532
002214 004767 OPCR:   JSR     PC,TTYOUT
       177512
002220 042701         BIC     #177600,R1
       177600
002224 120127         CMPB    R1,#CR
       000015
002230 001004         BNE     TCMD
002232 012701         MOV     #LF,R1
       000012
002236 000167         JMP     TTYOUT
       177470
                      ;
002242 010102 TCMD:   MOV     R1,R2
002244 000207         RTS     PC
                      ;
                      ;     OBTAIN CURRENT CONSOLE INPUT FIRE NUMBER
                      ;     SET TBL ADDR, ETC
002246 013701 FVAL:   MOV     @#INFST,R1
       167774
002252 042701         BIC     #017777,R1
       017777
002256 022701         CMP     #140000,R1
       140000
002262 001371         BNE     FVAL
002264 013701         MOV     @#INFST,R1
       167774
002270 042701         BIC     #177760,R1         ;(R1)=BINARY FIRE #(0-7)
       177760
002274 006101         ROL     R1          ;*4=TABLE ENTRY INDEX
002276 006101         ROL     R1
002300 016167'        MOV     FTD(R1),SQTBLA
       000000
       175476
002306 005721         TST     (R1)+
002310 016167'        MOV     FTD(R1),TTLNS     ;SET # ENTRIES THIS TABE
       000000
       175506
002316 000207         RTS     PC
       002320 PATCH:  .=.
       002464         .=.+100.
       000001         .END
```

```
ABORT   = 000030        AC      = 177302 G   ASCTBN  = ****** G
ASH     = 177316        BELL    = 000007     BLANK   = 000040 G
BLINE     000722RG      BLKFL     001430R    BNTASC  = ****** G
BRBK      001032R       BUMPF     001070R    BX      = 000000
BY      = 000002        BZ      = 000004     CHOP      001042R
CHRN    = ****** G      CLKPNT    000006R    CLKSET    000622RG
CLKV    = 000100        CLOKIN    000560R    CLRFLG    000054R
CLS       001260R       CMDN      002210R    CMDWRD  = 000043
COLCNT    000000R       COMMA   = 000054 G   COMSEP    001160R
COUNT     000026RG      CO2STP    114000     CO2STR    114001
CR      = 000015 G      CRECRD  = ****** G   CRLF      002202R
DCNT      001520R       DELETE    001466RG   DELEX     001664R
DELN      001524R       DELOOP    000426R    DELY      000422R
DEL1      001566R       DEL2      001640R    DEL3      001634R
DIV     = 177300 G      DLINE     001516R    DUM       000656R
DUMB      000650R       DUPE      000662R    DUPE1     000666R
DUPE2     000706R       ENDFLD    001412R    ENDFLG  = 000022R
ENDIT     000760R       END60     000616R    ERR       000020RG
ETTY      001100R       EXEC    = 000074RG   EXECA     001774R
EXEC1     000030R       EX5       000256R    EX6       000276R
EX7       000304R       FLDLNG  = 000005 G   FLSL      000200R
FTD     = ****** G      FVAL      002246R    GETSN     001266R
GETS1   = 004001 G      GETS2   = 004007 G   GOBACK    001446R
GSTAT2    000502R       GS2       000510R    GTLNUM  = ****** G
HOTFUL  = 100003        HOTOFF  = 100000     INFCMD  = 167772
INFST   = 167774        INSERT  = ****** G   INTLST    000000R
IZNOTT    000640R       LCT       000120R    LF      = 000012 G
LINE      000022RG      LINEA     000002RG   LINEND  = ****** G
LINO    = 000000        LIN1ST  = ****** G   LKS     = 177546 G
LNTRM     000752R       LOCTST    000112R    LSH     = 177314
MAXTM   = 000036        MINTM   = 000031     MN      = 000010
MODIFY  = ****** G      MORE      000742R    MP      = 000014
MQ      = 177304 G      MSG       001704R    MSGOUT    001670RG
MUL     = 177306 G      MVB     = ****** G   MX      = 000012
NDG       001400R       NDXSZ   = 000007     NDXTBL    001450R
NEWLN   = ****** G      NFLDS   = 000006 G   NODUPE    001006R
NOMORE    000764R       NOR     = 177312     NOTALL    001320R
NOTT      000630R       NUMMER    001022R    NXTFLD    000724R
NXTPTR    000572R       OBTAIN    001352R    OPCR      002214R
OPS       001250R       PATCH     002320R    PC      =%000007
PJSHUT  = 074000        PRINT   = ****** G   PRJFUL  = 070001
PROMPT  = 000075        PSW     = 177776 G   QUERY   = 000077
RDROFF  = 000023        RDRON   = 000021     RECORD  = ****** G
REQA    = 004002        REQB    = 004003     REQC    = 004004
REQD    = 004005        RESETS  = 134000     RESOL   = 000024
RQFTYP  = 004006        RSL     = 000006     R0      =%000000
R1      =%000001        R2      =%000002     R3      =%000003
R4      =%000004        R5      =%000005     R6      =%000006
SC      = 177310        SETHT     001166R    SETS      001214R
SHUTDN    000336R       SKPZ    = 000606R    SLASH   = 000057
SLNG    = 000016 G      SNDFUL  = 104003     SNDOFF  = 104000
SP      =%000006        SQTBL   = ****** G   SQTBLA    000004RG
SR      = 177311        STAT1   = 004001     STAT2   = 004007
STEX      000500R       STPL      000442R    STPTST    000434RG
TBLBLD  = ****** G      TB10      000014R    TB15      000010R
TCMD      002242R       TEX1      002142R    TEX2      002146R
TEX3      002152R       TEX4      002156R    TEX5      002162R
TEX6      002166R       TEX7      002172R    TEX8      002176R
TKB     = 177562        TKS     = 177560     TMR10     000016R
TMR15     000012R       TMSTRT    000534RG   TMTL      000720R
TPB     = 177566        TPS     = 177564     TTLNS     000024RG
TTS     = ****** G      TTYIP   = 002030R    TTYMON    002304RG
TTYN      001746RG      TTYOUT    001732RG   TTYTST    000100R
TXLNG   = 000043        WRITE   = ****** G   XAXIS   = 000005 G
XSIZE   = 000006 G      YAXIS   = 000012     YSIZE   = 000010 G
ZAXIS   = 000017        .       = 002464R
```

```
            000000              .CSECT
                                .GLOBL   ASCTBN,BNTASC
                                .GLOBL   MUL,TBLBLD,INSERT,MODIFY,DELETE,PRINT
                                .GLOBL   WRITE,GTLNUM,GETS1,GETS2,TMSTRT,CLKSET
                                .GLOBL   BLINE,AC,BLANK,COMMA,COUNT,CR,DIV,ERR
                                .GLOBL   FLDLNG,LF,LINE,LINEA,LINEND,LINIST,MQ
                                .GLOBL   MSGOUT,MVB,NEWLN,NEWLNA,NFLDS
                                .GLOBL   SLNG,SQTBL,SQTBLA,STPTST,CHRN,TTLNS
                                .GLOBL   TTS,TTYN,TTYOUT,XAXIS,RECORD,EXEC
                                .GLOBL   PSW,LKS,FTD,CRECRD,XSIZE,YSIZE
            167774    INFST=167774              ;DR11 STATUS WORD
            167772    INFCMD=167772             ;DR11 COMMAND WORD
                              ; REGISTER EQUATES
            000000              R0=%0
            000001              R1=%1
            000002              R2=%2
            000003              R3=%3
            000004              R4=%4
            000005              R5=%5
            000006              R6=%6
            000007              R7=%7
            000006              SP=%6
            000007              PC=%7
                              ;
                              ;
                              ;       MISCELLANEOUS WORK AREAS ETC
                              ;
000000 000000      ABASE:   .WORD    0         ;LOAD CELL
000002 000000      BBASE:   .WORD    0         ;NO LOAD O/P
000004 000000      CBASE:   .WORD    0         ;VALUES
000006 000000      DBASE:   .WORD    0
                              ;
                              ; MODIFY SPECIFIED LINE/LINES IN SEQ TABLE
                              ;
000010 004767      MODIFY:  JSR      PC,GTLNUM ;LINE=LINE NUM TO MODIFY
       000024
                              ;
000014 026767               CMP      LINE,TTLNS ;?LINE>LINES IN SEQ TABLE?
       000000
       000000
000022 003401               BLE      .+4        ;NO-
000024 000207               RTS      PC         ;YES-EXIT
                              ;
000026 004767               JSR      PC,MVOLD   ;NEWLN=SEQ TABLE ENTRY
       000740
                                                ;  AT LINE
                              ;
000032 004767               JSR      PC,TBLBL1  ;ENTER MODIFIED LINE INTO
       000114
                                                ; SEQ TABLE
000036 000764               BR       MODIFY     ;EXIT
                              ;
                              ; 1. LINE=LINE NUM  2. ECHO LINE NUM WITH CR
                              ;
000040 012701      GTLNUM:  MOV      #LNBUF,R1  ;INIT LINE NUM BUFF
       000142
000044 112721      MSQT5:   MOVB     #40,(R1)+
       000040
000050 022701               CMP      #LNBUF+3,R1
       000145
000054 001373               BNE      MSQT5
000056 012702               MOV      #LNBUF,R2
       000142
000062 004567      MSQT2:   JSR      R5,CHRN    ;R1=NXT CHAR OF LINE NUM
       000456
000066 000402               BR       MSQT1      ;NUM (0-9)
000070 000415               BR       MSQT4      ;COMMA
000072 000406               BR       MSQT3      ;CR
                              ;
000074 110122      MSQT1:   MOVB     R1,(R2)+
000076 004767               JSR      PC,TTYOUT  ;ECHO NXT LINE NUM DIGIT
       000000
000102 022702               CMP      #LNBUF+3,R2 ;3RD DIGIT OF LINE NUM IN?
       000145
000106 001365               BNE      MSQT2      ;NO-GET NXT DIGIT
```

```
000110 112701 MSQT3:   MOVB    #15,R1              ;YES-CR/LF
       000015
000114 004767'         JSR     PC,TTYOUT
       000000
000120 112701          MOVB    #12,R1
       000012
       000124 MSQT4=.
000124 004767'         JSR     PC,TTYOUT
       000000
                       ;
000130 004567          JSR     R5,ASCTBN           ;BINARY LINE NUM IN 'LINE
       001066
000134 000142'         .WORD   LNBUF
000136 000000'         .WORD   LINE
000140 000207          RTS     PC                  ;EXIT
000142 000000 LNBUF:   .WORD   0
000144 020000          .WORD   20000
                       ;
                       ; ENTER SPECIFIED LINE/LINES INTO SEQ TABLE
                       ;   THIS RTN EXITS BACK TO EXEC VIA A TTY / CHR ENTRY
000146 005067'TBLBLD:  CLR     LINE
       000000
000152 004767'TBLBL1:  JSR     PC,BLINE            ;BUILD NXT SEQ TABLE LINE
       000000
                       ;
000156 004767          JSR     PC,MVTSQ            ;MOVE NXT SEQ TABLE LINE
       000436
                                                   ; TO SEQ TABLE
000162 005267'         INC     LINE                ;LINE=LINE+1
       000000
                       ;
000166 004567          JSR     R5,BNTASC           ;NEWLN=LINE IN ASCII
       001132
000172 000000'         .WORD   LINE
000174 001134'         .WORD   NEWLN
000176 000004          .WORD   4
000200 000764          BR      TBLBL1
                       ;
                       ; INSERT SPECIFIED LINE/LINES INTO SEQ TABLE
                       ;
000202 004767 INSERT:  JSR     PC,GTLNUM           ;LINE=LINE NUM TO MODIFY
       177632
000206 005767'         TST     LINE                ;?LINE>0?
       000000
000212 001417          BEQ     INSERR              ;YES-EXIT THRU ERR MSG
000214 004767          JSR     PC,MVOLD            ;NEWLN=SEQ TABLE ENTRY AT
       000552
                                                   ; LINE
000220 004767'INSER1:  JSR     PC,BLINE            ;BUILD NXT SEQ TABLE LINE
       000000
                       ;
       000224 INEXIT=.
000224 004567          JSR     R5,INSRT            ;INSERT NXT LINE IN SEQ
       000346
                                                   ; TABLE
000230 000410          BR      INSERR              ;ERROR
000232 005267'         INC     LINE                ;LINE=LINE+1
       000000
000236 004567          JSR     R5,BNTASC           ;NEWLN=LINE IN ASCII
       001062
000242 000000'         .WORD   LINE
000244 001134'         .WORD   NEWLN
000246 000004          .WORD   4
000250 000763          BR      INSER1              ;BACK TO LOOP
                       ;
000252 004567'INSERR:  JSR     R5,MSGOUT
       000000
000256 000262'         .WORD   ISMSG
000260 000750          BR      INSERT
                       ;
000262    111 ISMSG:   .ASCII  /INSERT ERR/
000263    116
000264    123
000265    105
000266    122
```

```
000267    124
000270    040
000271    105
000272    122
000273    122
000274    015            .BYTE    15
       000276            .EVEN
              ; INSERT A LINE IN SEQUENCE TABLE
              ;     TTLNS CONTAINS TOTAL # LINES IN TABLE
              ;     NEWLN CONTAINS NEW LINE TEXT
              ;
              ;     CALL VIA JSR R5
              ;     ERROR RETURN @R5
              ;     NORMAL RETURN 2(R5)
              ;
000276 016701'INSRT:  MOV    LINE,R1        ; WITHIN TABLE ?
       000000
000302 026701'        CMP    TTLNS,R1
       000000
000306 002761         BLT    INSERR         ; BR=NO
              ;
000310 016737'        MOV    TTLNS,@#MQ
       000000
       000000
000316 012737'        MOV    #SLNG,@#MUL    ; ENTRY LENGTH
       000000
       000000
              ;
000324 013702'        MOV    @#MQ,R2        ; #BYTES IN TABLE
       000000
              ;
000330 066702'        ADD    SQTBLA,R2      ; ADDRESS OF TABLE END+2
       000000
              ;
000334 010203         MOV    R2,R3          ; SAVE FROM
000336 062703'        ADD    #SLNG,R3       ; GET "TO"
       000000
              ;
000342 012704'INS1:   MOV    #SLNG,R4       ; MOVE ONE LINE
       000000
000346 114243 INS2:   MOVB   -(R2),-(R3)
000350 005304         DEC    R4
000352 001375         BNE    INS2
000354 005201         INC    R1
000356 026701'        CMP    TTLNS,R1       ; ALL DONE ?
       000000
000362 002367         BGE    INS1           ; BR=NO
000364 004767         JSR    PC,MVTSQ       ; MOVE NEW LINE TO
       000230
              ;                               VACATED SPACE
000370 005267'        INC    TTLNS          ; PUT NEW TOTAL LINES
       000000
000374 005725         TST    (R5)+          ; BUMP FOR NORMAL RETURN
000376 000205         RTS    R5
              ;
              ; PRINT SPECIFIED LINE/LINES FROM SEQ TABLE 000400 004767 PRINT:  JSR    PC,GTLNUM      ;LINE=1ST LINE TO LIST
       177434
              ;
000404 016767'        MOV    LINE,LINIST    ;LINIST=1ST LINE TO LIST
       000000
       000030
000412 004767         JSR    PC,GTLNUM
       177422
              ;
000416 016767'        MOV    LINE,LINEND
       000000
       000020
000424 066767         ADD    LINIST,LINEND
       000012
       000012
```

```
000432 005367            DEC      LINEND        ;LINEND=LAST LINE TO LIST
       000006
                  ;
000436 004567            JSR      R5,DSPLY      ;LIST SPECIFIED SEQ TABLE
       000010
                                                ; LINES
000442 000000 LINIST:    .WORD    0
000444 000000 LINEND:    .WORD    0
000446 000167'           JMP      EXEC
       000000
              ; PRINT SEQ TABLE ENTRIES
              ;     CALL VIA JSR R5
              ;            .WORD    1ST LINE# TO PRINT
              ;            .WORD    LAST LINE# TO PRINT
              ;
000452 012503 DSPLY:     MOV      (R5)+,R3
000454 012504            MOV      (R5)+,R4
              ;
000456 020304 DSP1:      CMP      R3,R4
000460 003003            BGT      DSPEX
              ;
000462 026703'           CMP      TTLNS,R3      ; NXT LINE IN TBL ?
       000000
000466 002001            BGE      DSP2          ; BR=YES 000470 000205 DSPEX:     RTS      R5
000472 010367'DSP2:      MOV      R3,LINE       ; MOVE LINE TO NEWLN
       000000
000476 004767            JSR      PC,MVOLD
       000270
000502 004767            JSR      PC,TYPLN      ; PRINT IT
       000034
              ;
000506 005203            INC      R3
000510 000762            BR       DSP1
              ; OUTPUT NEWLN TO TTY
              ;     CALL VIA JSR PC
              ;
000512 012702'TYPLN:     MOV      #NEWLN,R2     ;GET TEXT ADDRESS
       001134
000516 111201 TL1:       MOVB     @R2,R1        ;GET NXT CHAR
000520 004767'           JSR      PC,TTYOUT     ;PRINT IT
       000000
              ;
000524 122227'           CMPB     (R2)+,#CR     ;DONE ?
       000000
000530 001372            BNE      TL1
              ;
000532 112701'           MOVB     #LF,R1
       000000
000536 004767'           JSR      PC,TTYOUT     ;PUT LINE FEED
       000000
              ;
000542 000207            RTS      PC
              ;
              ;INPUT ONE CHAR FOR SEQ TABLE
              ;     CALL VIA JSR R5,CHN
              ;     RETURNS
              ;     @R5   CHAR IS NUMERIC
              ;     2(R5) BLANK OR COMMA
              ;     4(R5) CHAR IS CR
              ;
000544 004767'CHRN:      JSR      PC,TTYN       ; GET CHAR
       000000
000550 120127            CMPB     R1,#60        ; NUMERIC ?
       000060
000554 002404            BLT      CHR1          ; BR=NO
              ;
000556 120127            CMPB     R1,#71
       000071
000562 003370            BGT      CHRN          ; BR=NOT NUMERIC,BLANK
                                                ; COMMA,CR
000564 000205            RTS      R5
              ;
```

```
000566 120127'CHR1:   CMPB    R1,#BLANK
       000000
000572 001407         BEQ     CHR2
000574 120127'        CMPB    R1,#COMMA
       000000
000600 001404         BEQ     CHR2
000602 120127'        CMPB    R1,#CR
       000000
000606 001356         BNE     CHRN
000610 005725         TST     (R5)+
000612 005725 CHR2:   TST     (R5)+
000614 000205         RTS     R5
                      ;
                      ; MOVE NEWLN TO SEQ TABLE
000616 000000 TMTL:   .WORD   0
                      ;
000620 010146 MVTSQ:  MOV     R1,-(SP)
000622 010246         MOV     R2,-(SP)
000624 010346         MOV     R3,-(SP)
000626 004567         JSR     R5,ASCTBN
       000370
000632 001134'        .WORD   NEWLN
000634 000616'        .WORD   TMTL
000636 026767'        CMP     TTLNS,TMTL
       000000
       177752
000644 003007         BGT     MVTC
000646 016767'        MOV     TMTL,TTLNS      ;PUT NEW TOTAL #LINES
       177744
       000000
                      ;
000654 004567         JSR     R5,ASCTBN
       000342
000660 001134'        .WORD   NEWLN
000662 000000'        .WORD   LINE
                      ;
000664 016737'MVTC:   MOV     LINE,@#MQ
       000000
       000000
000672 012737'        MOV     #SLNG,@#MUL     ;#BYTES/POINT
       000000
       000000
                      ;
000700 013701'        MOV     @#MQ,R1
       000000
000704 066701'        ADD     SQTBLA,R1       ; TO ADDRESS TO R1
       000000
                      ;
000710 012702'        MOV     #NEWLN,R2
       001134
000714 062702'        ADD     #FLDLNG,R2      ; FROM ADDRESS TO R2
       000000
                      ;
000720 012703'        MOV     #NFLDS,R3
       000000
                      ;
000724 010167 MVTLP:  MOV     R1,MVTD         ; SET TO ADDRESS
       000012
000730 010267         MOV     R2,MVTE         ; SET FROM ADDRESS
       000004
                      ;
000734 004567         JSR     R5,ASCTBN       ; MOVE ONE FLD
       000262
000740 000000 MVTE:   .WORD   0
000742 000000 MVTD:   .WORD   0
                      ;
000744 062702'        ADD     #FLDLNG,R2      ; BUMP POINTERS
       000000
000750 005721         TST     (R1)+
                      ;
000752 005303         DEC     R3              ; DONE ?
000754 001363         BNE     MVTLP           ; BR=NO
000756 112221         MOVB    (R2)+,(R1)+     ;MOVE BINARY DEVICE
                                              ;ACTION WORD
```

```
000760 112221            MOVB     (R2)+,(R1)+
000762 012603            MOV      (SP)+,R3
000764 012602            MOV      (SP)+,R2
000766 012601            MOV      (SP)+,R1
000770 000207            RTS      PC
                    ;
                    ; MOVE SEQ TABLE ENTRY TO NEWLN
                    ;        INPUT: "LINE" SET
                    ;
000772 010146    MVOLD:  MOV      R1,-(SP)
000774 010246            MOV      R2,-(SP)
001000 004567 ;          JSR      R5,BNSR5C      ; PUT LINE # IN TEXT
       000320
001004 000000'MVDA:      .WORD    LINE
001006 001134'MVDB:      .WORD    NEWLN
001010 000004             .WORD   4
001012 016702'            MOV     LINE,R2
       000000
                    ;
001016 010237'MVDCL:     MOV      R2,@#MQ        ; MULT LINE #
       000000
001022 012737'           MOV      #SLNG,@#MUL    ; BY LINE LENGTH
       000000
       000000
001030 013701'           MOV      @#MQ,R1
       000000
001034 066701'           ADD      SQTBLA,R1      ; ADDRESS OF SEQTBL ENTRY
       000000
                    ;
001040 012702'MVDN:      MOV      #NEWLN,R2
       001134
001044 062702'           ADD      #XAXIS,R2
       000000
                    ;
001050 012703'           MOV      #NFLDS,R3      ; GET # FLDS
       000000
                    ;
001054 112762'MVD:       MOVB     #COMMA,-1(R2)  ; PUT COMMA AFTER FLD
       000000
       177777
                    ;
001062 010267            MOV      R2,MVDC
       000012
001066 010167            MOV      R1,MVDD
       000004
                    ;
001072 004567            JSR      R5,BNTASC
       000226
001076 000000 MVDD:      .WORD    0
001100 000000 MVDC:      .WORD    0
001102 000004            .WORD    4
                    ;
001104 005721            TST      (R1)+          ; BUMP BINARY PTR
001106 062702'           ADD      #FLDLNG,R2     ; BUMP TEXT PTR
       000030
                    ;
001112 005303            DEC      R3             ; LAST FLD ?
001114 001357            BNE      MVD            ; BR=NO
                    ;
001116 112762'           MOVB     #CR,-1(R2)
       000000
       177777
001124 012603            MOV      (SP)+,R3
001126 012602            MOV      (SP)+,R2
001130 012601            MOV      (SP)+,R1
001132 000207            RTS      PC
                    ;
                    ;   TEXT BUFFERS
                    ;
001134 000000 NEWLN:     .WORD    0
       001206             .=.+40.
                    ;
001206 000000 ZEROS:     .WORD    0
001210 000000            .WORD    0
```

```
001212 000000              .WORD   0
001214 000000              .WORD   0
001216 000000              .WORD   0
001220 000000              .WORD   0
                   ;
                   ; CONVERT ASCII STRING TO BINARY
                   ;       JSR     R5,ASCTBN
                   ;       .WORD   ADDRESS OF INPUT STRING
                   ;       .WORD   ADDRESS OF BINARY DEST
                   ;
                   ;       CONVERSION TERMINATES AFTER 5 CHAR
                   ;       OR 1ST BLANK OR COMMA
                   ;
001222 010146 ASCTBN: MOV   R1,-(SP)
001224 010246        MOV   R2,-(SP)
001226 010346 ;      MOV   R3,-(SP)
001230 005001        CLR   R1              ; BINARY ACC
001232 012502        MOV   (R5)+,R2        ; STRING ADDRESS
                   ;
001234 012767'       MOV   #5,COUNT
       000005
       000000
                   ;
001242 112203 ASC1:  MOVB  (R2)+,R3        ; GET NXT BYTE
001244 120327'       CMPB  R3,#COMMA       ; TERMINATING CHAR ?
       000000
001250 001420        BEQ   ASC2            ; BR=YES
                   ;
001252 120327'       CMPB  R3,#BLANK
       000000
001256 001415        BEQ   ASC2            ; BR=YES
                   ;
001260 042703        BIC   #177760,R3      ; ISOLATE BCD BITS
       177760
                   ;
001264 010137'       MOV   R1,@#MQ         ; ACC TIMES TEN
       000000
001270 012737'       MOV   #10.,@#MUL
       000012
       000000
                   ;
001276 013701'       MOV   @#MQ,R1         ; GET PRODUCT
       000000
001302 060301        ADD   R3,R1           ; ADD LATEST DIGIT
                   ;
001304 005367'       DEC   COUNT           ; LAST DIGIT ?
       000000
001310 001354        BNE   ASC1            ; BR=NO
                   ;
001312 010135 ASC2:  MOV   R1,@(R5)+       ; PUT RESULT
                   ;
001314 012603        MOV   (SP)+,R3
001316 012602        MOV   (SP)+,R2
001320 012601        MOV   (SP)+,R1
001322 000205        RTS   R5
                   ;
                   ; CONVERT BINARY TO ASCII, LEFT JUST BLANK FILL
                   ;       JSR     R5,BNTASC
                   ;       .WORD   PTR TO BINARY DATA
                   ;       .WORD   PTR TO DESTINATION
                   ;       .WORD   BYTE COUNT
                   ;
001324 010146 BNTASC: MOV  R1,-(SP)
001326 010246        MOV   R2,-(SP)
001330 010346        MOV   R3,-(SP)
001332 013501        MOV   @(R5)+,R1       ; BINARY DATA
                   ;
001334 012702'       MOV   #TBUF,R2        ; GET CHAR BUFFER ADDRES
       001520
                   ;
001340 004567        JSR   R5,BNT          ; CONVT TO ASCII IN BUFFER
       000120
001344 023420        .WORD 10000.
                   ;
```

```
001346 004567           JSR     R5,BNT
       000112
001352 001750           .WORD   1000.
                    ;
001354 004567           JSR     R5,BNT
       000104
001360 000144           .WORD   100.
                    ;
001362 004567           JSR     R5,BNT
       000076
001366 000012           .WORD   10.
                    ;
001370 152701           BISB    #60,R1
       000060
001374 110112           MOVB    R1,@R2          ; LSD
                    ;
001376 005202           INC     R2      ;TBUF ADDR TO R2
                    ;
001400 012501           MOV     (R5)+,R1        ; DESTNATION ADDRESS
001402 011503           MOV     @R5,R3          ; #BYTES
001404 161502           SUB     @R5,R2
001406 112721 BNL:      MOVB    #BLANK,(R1)+    ; BLANK FILL
       000000
001412 005303           DEC     R3
001414 001374           BNE     BNL
                    ;
001416 016501           MOV     -2(R5),R1       ; DESTINATION
       177776
001422 012503           MOV     (R5)+,R3        ; COUNT
                    ;
001424 122722 BN2:      CMPB    #60,(R2)+       ; FIND 1ST NON-ZERO
       000060
001430 001005           BNE     BN3
001432 005303           DEC     R3              ; ALL ZERO ?
001434 001373           BNE     BN2             ; BR=NO
001436 112711           MOVB    #60,@R1         ; PUT 1 ZERO
       000060
001442 000404           BR      BN5             ; EXIT
                    ;
001444 005302 BN3:      DEC     R2              ; MOVE TBUF TO DEST
001446 112221 BN4:      MOVB    (R2)+,(R1)+
001450 005303           DEC     R3
001452 001375           BNE     BN4
                    ;
001454 012603 BN5:      MOV     (SP)+,R3
001456 012602           MOV     (SP)+,R2
001460 012601           MOV     (SP)+,R1
001462 000205           RTS     R5
                    ;
001464 010137 BNT:      MOV     R1,@#MQ         ; PUT DIVIDEND
       000000
001470 005037           CLR     @#AC
       000000
                    ;
001474 012537           MOV     (R5)+,@#DIV     ; DIVIDE
       000000
                    ;
001500 013701           MOV     @#MQ,R1         ; GET QUOTIENT
       000000
                    ;
001504 152701           BISB    #60,R1          ; MAKE NUMERIC ASCII
       000060
001510 110122           MOVB    R1,(R2)+        ; PUT CHAR
                    ;
001512 013701           MOV     @#AC,R1         ; GET REMAINDER
       000000
                    ;
001516 000205           RTS     R5
                    ;
001520 000000 TBUF:     .WORD   0
001522 000000           .WORD   0
001524 000000           .WORD   0
```

;                   COMMAND WORD EXECUTION ROUTINE
;
;           JSR     PC,CMDXEC
;                           R1 WILL CONTAIN ENCODED CMD
;           RETURN  EXECUTIONN REQUEST IN WHICH

```
001526 010346 CMDXEC: MOV    R3,-(SP)         ;B15=1,=SET SND LVL FROM
                                              ; B11-10
001530 010446         MOV    R4,-(SP)         ;B14=1,=SET HEAT LVL
                                              ;FROM B9-8
001532 010546         MOV    R5,-(SP)
001534 010103         MOV    R1,R3            ;B7=1,=SET SHUTTERS AS
                                              ; PER B5-0
001536 005703         TST    R3               ; IN WHICH B5-3=SHUTTER
        ;                                       COLUMN 1-6
001540 100011         BPL    NOSOND           ;ARE ENCODED AS VALUES 0-5 AND
001542 000303         SWAB   R3               ;B2-0 ENCODED AS 7-0 VALUES
001544 006003         ROR    R3               ;CORRESPOND TO SHUTTER ROW H
                                              ;THRU A
001546 006003         ROR    R3               ;ISOLATE SOUND LEVEL
001550 042703         BIC    #177774,R3
       177774
001554 052703         BIS    #104000,R3
       104000
001560 010337         MOV    R3,@#INFCMD      ;SET SOUND
       167772
001564 010103 NOSOND: MOV    R1,R3
001566 006103         ROL    R3
001570 005703         TST    R3
001572 100010         BPL    NOTHOT
001574 010103         MOV    R1,R3
001576 000303         SWAB   R3
001600 042703         BIC    #177774,R3
       177774
001604 052703         BIS    #100000,R3
       100000
001610 010337         MOV    R3,@#INFCMD      ;SET HEAT
       167772
001614 005003 NOTHOT: CLR    R3
001616 110103         MOVB   R1,R3
001620 006303         ASL    R3
001622 006303         ASL    R3
001624 000303         SWAB   R3
001626 016303         MOV    TYPTBL(R3),R3
       001744
001632 001432         BEQ    RSTREG           ;IF ZERO=NO SHUTTER UPDATE
001634 005303         DEC    R3               ;ADJUST,R3(0)=BIT FLAG FOR
                                              ; UPDATE
001636 012704         MOV    #1,R4            ;AND IT'S CORRESPONDING MASK
       000001
001642 010105         MOV    R1,R5
001644 042705         BIC    #7,R5
       000007
001650 006303 SHIFT:  ASL    R3
001652 006304         ASL    R4
001654 005305         DEC    R5
                      BNE    SHIFT
001660 006001         ROR    R1
001662 006001         ROR    R1
001664 006001         ROR    R1
001666 042701         BIC    #177770,R1
       177770
001672 040461         BIC    R4,SHSTAT(R1)    ;CLEAR SHUTTER BIT
       001730
001676 050361         BIS    R3,SHSTAT(R1)    ;SET/RESET BIT TO
       001730
                                              ; DETERMINE
001702 012701         MOV    #6,R1            ;NEW STATE
       000006
001706 016167 SHLOOP: MOV    SHSTAT(R1),INFCMD ;COMMAND SHUTTERS
       001730
       167772
        ;                                     ;LOOP
001714 005301         DEC    R1
001716 001373         BNE    SHLOOP
001720 012603 RSTREG: MOV    (SP)+,R3
```

```
001722 012604           MOV     (SP)+,R4
001724 012605           MOV     (SP)+,R5
001726 000207           RTS     PC
               ;
               ;        FOLLOWING TABLE KEEPS TRACK OF SHUTTER STATE
               ;
               ;        RT BYTES OF WORDS FOLLOWING ARE A STATE BIT
               ;        MATRIX IN WHICH 1=OPEN,0=CLOSED
               ;
001730 040000  SHSTAT:  .WORD   040000          ;COL 1   ROWS H-A
001732 044000           .WORD   044000          ;COL 2
001734 050000           .WORD   050000          ;COL3
001736 054000           .WORD   054000          ;COL 4
001740 060000           .WORD   060000          ;COL 5
001742 064000           .WORD   064000          ;COL 6
001744 000000  TYPTBL:  .WORD   0
001746 000001           .WORD   1
001750 000002           .WORD   2
001752 000000           .WORD   0
               ;
               ;        CONVERT/PRINT RAW LOAD CELL VALUES
               ;        IN SIGNED DECIMAL
               ;        R0=I/P DATA (BYTE) ADR
               ;
001754 010346  TTYCNV:  MOV     R3,-(SP)
001756 010446           MOV     R4,-(SP)
001760 112003           MOVB    (R0)+,R3
001762 112704           MOVB    #53,R4
       000053
001766 105703           TSTB    R3
001770 100003           BPL     MOVSGN
001772 112704           MOVB    #55,R4
       000055
001776 105403           NEGB    R3              ;DISP IN TRUE FORM
002000 110421  MOVSGN:  MOVB    R4,(R1)+
002002 010337'          MOV     R3,@#MQ
       000000
002006 012737'          MOV     #100.,@#DIV
       000144
       000000
002014 113711'          MOVB    @#MQ,(R1)
       000000
002020 152721           BISB    #60,(R1)+
       000060
002024 013737'          MOV     @#AC,@#MQ
       000000
       000000
002032 012737'          MOV     #10.,@#DIV
       000012
       000000
002040 113711'          MOVB    @#MQ,(R1)
       000000
002044 152721           BISB    #60,(R1)+
       000060
002050 113711'          MOVB    @#AC,(R1)
       000000
002054 152721           BISB    #60,(R1)+
       000060
002060 105721           TSTB    (R1)+
002062 105721           TSTB    (R1)+
002064 010326           MOV     R3,(SP)+
002066 010426           MOV     R4,(SP)+
002070 000205           RTS     R5
               ;        JSR     R0,GETV         REQUEST LCV DATA AS PER
               ;                                RDCMD AND REUTRN DATA
               ;        REOBEN  RDCMD   IN R1
002072 012067' GETV:    MOV     (R0)+,INFCMD
       167772
002076 013701' OPNCHG:  MOV     @#INFST,R1
       167774
002102 042701           BIC     #17777,R1
       017777
002106 001773           BEQ     OPNCHG
002110 113701           MOVB    @#INFST,R1
       167774
```

```
002114 000200         RTS    R0
                      ;             FORMAT RECORD DATA IF COORDINATE FORM
                      ;             COMPUTE COORDINATE VALUES IN ORDER
                      ;             X(A,D),X(B,C),Y(A,B),Y(D,C)
       002116 REDUCE=.
002116 111003         MOVB   (R0),R3
002120 116004         MOVB   3(R0),R4
       000003
002124 166703         SUB    ABASE,R3
       175650
002130 166705         SUB    DBASE,R5
       175652
002134 004567         JSR    R5,RCOORD
       000110
002140 000000'        .WORD  XSIZE
002142 116003         MOVB   1(R0),R3
       000001
002146 116004         MOVB   2(R0),R4
       000002
002152 166703         SUB    BBASE,R3
       175624
002156 166704         SUB    CBASE,R4
       175622
002162 004567         JSR    R5,RCOORD
       000062
002166 000000'        .WORD  XSIZE
002170 111003         MOVB   (R0),R3
002172 116004         MOVB   1(R0),R4
       000001
002176 166703         SUB    ABASE,R3
       175576
002202 166704         SUB    BBASE,R4
       175574
002206 004567         JSR    R5,RCOORD
       000036
002212 000000'        .WORD  YSIZE
002214 116003         MOVB   3(R0),R3
       000003
002220 116004         MOVB   2(R0),R4
       000002
002224 166703         SUB    CBASE,R3
       175554
002230 166704         SUB    BBASE,R4
       175546
002234 004567         JSR    R5,RCOORD        ;ADD Z-AXIS LATER
       000010
002240 000000'        .WORD  YSIZE
002242 062700         ADD    #4,R0
       000004
002246 000207         RTS    PC
                      ;
002250 010337'RCOORD=.                GENERATE A SINGLE COORDINATE VALUE
                      MOV    R3,@#MQ
       000000
002254 012737'        MOV    #1000.,@#MUL
       001750
       000000
002262 060304         ADD    R3,R4
002264 001004         BNE    NZDIV
002266 012737'        MOV    #1000.,@#MQ
       001750
       000000
002274 000407         BR     ZDIV
       002276 NZDIV=.
002276 010437'        MOV    R4,@#DIV
       000000
002302 162737'NRND:   SUB    #1000.,@#MQ
       001750
       000000
002310 005437'        NEG    @#MQ
       000000
       002314 ZDIV=.
002314 012537'        MOV    (R5)+,@#MUL
       000000
```

```
002320 005737'          TST     @#AC
       000000
002324 100003           BPL     IZPOS
002326 105741           TSTB    -(R1)
002330 112721           MOVB    #55,(R1)+
       000055
002334 012737'IZPOS:    MOV     #10000.,@#DIV
       023420
       000000
002342 113711'          MOVB    @#MQ,(R1)
       000000
002346 105711           TSTB    (R1)
002350 001003           BNE     MOVDIG
002352 112721           MOVB    #40,(R1)+
       000040
002356 000402           BR      BLKSUB
002360 152721 MOVDIG:   BISB    #60,(R1)+
       000060
002364 013737'BLKSUB:   MOV     @#AC,@#MQ
       000000
002372 012737'          MOV     #1000.,@#DIV
       001750
       000000
002400 113711'          MOVB    @#MQ,(R1)
       000000
002404 152721           BISB    #60,(R1)+
       000060
002410 112721           MOVB    #56,(R1)+      ;PERIOD
       000056
002414 013737'          MOV     @#AC,@#MQ
       000000
       000000
002422 012737'          MOV     #100.,@#DIV
       000144
       000000
002430 113711'          MOVB    @#MQ,(R1)
       000000
002434 152721           BISB    #60,(R1)+
       000060
002440 013737'          MOV     @#AC,@#MQ
       000000
       000000
002446 012737'          MOV     #10.,@#DIV
       000012
       000000
002454 113711'          MOVB    @#MQ,(R1)
       000000
002460 152721           BISB    #60,(R1)+
       000060
002464 105721           TSTB    (R1)+
002466 000205           RTS     R5
```

```
        ;THIS IS THE START OF THE RECORD R.N
        ;
        ;       RECORD  SUBROUTINE      THIS ROUTINE WILL AFTER
        ;                               ALL TEST STARTUP CONDITIONS ARE COMPLETE
        ;                               RECORD 60(10) POINTS AT 0.25 SEC
        ;                               INTERVALS, SAVE THEM IN A BFR AND PRINT
        ;                               THEM WHEN DONE RECORDING.  POINTS ARE
        ;                               SAVED IN RECBFR.
002470 RECORD=.
002470 012737'TSTCHG:   MOV     #GETS2,@#INFCMD ;GET STATUS 2
       000000
       167772
002476 022737           CMP     #160001,@#INFST
       160001
       167774
002504 001371           BNE     TSTCHG          ;IF NOT CHARGED
002506 012737'TSTCO2:   MOV     #GETS1,@#INFCMD
       000000
       167772
002520 022737           CMP     #020000,@#INFST
```

```
002524 004067          JSR     R0,GETV
       177342
002530 004002          .WORD   4002
002532 110167          MOVB    R1,ABASE        ; LOAD CELL A
       175242
002536 004067          JSR     R0,GETV
       177330
002542 004003          .WORD   4003
002544 110167          MOVB    R1,BBASE        ; B
       175232
002550 004067          JSR     R0,GETV
       177316
002554 004004          .WORD   4004
002556 110167          MOVB    R1,CBASE        ; C
       175222
002562 004067          JSR     R0,GETV
       177304
002566 004005          .WORD   4005
002570 110167          MOVB    R1,DBASE        ; D
       175212
002574 004067'         JSR     R0,CLKSET
       000000
002600 003104'         .WORD   RCCLB
002602 004067'         JSR     R0,TMSTRT
       000000
002606 012700'         MOV     #RECBFR,R0      ;CHR CTR
       003110
002612 012767          MOV     #15,RCLOCK
       000017
       000266
002620 005767 HANG:    TST     RCLOCK
       000262

002624 003375          BGT     HANG            ;WAIT FOR CLOCK TIME OUT
002626 012737'         MOV     #GETS1,@#INFCMD
       000000
       167772
002634 013701 STBCK:   MOV     @#INFST,R1      ;CHECK NOZZZLE STILL ON
       167774
002640 042701          BIC     #17777,R1
       017777
002644 022701          CMP     #020000,R1
       020000
002650 001371          BNE     STBCK
002652 013701          MOV     @#INFST,R1
       167774
002656 042701          BIC     #160000,R1
       160000
002662 122701          CMPB    #1,R1
       000001
002666 001351          BNE     NXTCLK          ;RESTRT IF NOZZLE OFF
002670 004067          JSR     R0,GETV
       177176
002674 004002          .WORD   004002          ;REC OP CODE
002676 110120          MOVB    R1,(R0)+        ;A VALUE STORED
002700 004067          JSR     R0,GETV
       177166
002704 004003          .WORD   004003
002706 110120          MOVB    R1,(R0)+
002710 004067          JSR     R0,GETV
       177156
002714 004004          .WORD   004004
002716 110120          MOVB    R1,(R0)+
002720 004067          JSR     R0,GETV
       177146
002724 004005          .WORD   004005
002726 110120          MOVB    R1,(R0)+
002730 022700'         CMP     #RECBFR+240.,R0
       003470
002734 003326          BGT     NXTCLK
002736 012767'         MOV     #300,PSW        ;STOP TIMER
       000300
       000000
002744 005067'         CLR     LKS
       000000
```

```
              ;         CLEAR TTY O/P.LINE BUFFER SUBRTN
              ;         JSR     PC,BLKLNE
              ;         RETURN
002750 005003 BLKLNE:   CLR     R3
002752 012763'BLKFIL:   MOV     #020040,TTYBFR(R3)        ;BLANK TTYOUT BR
       020040
       003470
002760 005723           TST     (R3)+
002762 022703           CMP     #42.,R3
       000052
002766 001371           BNE     BLKFIL
002770 000207           RTS     PC
              ;         60. PTS RECORDED
              ;         PRINT DATA IN BOTH RAW
              ;         AND REDUCED FORM
       002772 OPRECD=.
002772 012700'          MOV     #RECBFR,R0                ;SRC PNTR
       003110
002776 012701'NXTLNE:   MOV     #TTYBFR+2,R1    ;DST PTR
       003472
003002 004767           JSR     PC,BLKLNE
       177742
       003006 NRED=.
003006 004567           JSR     R5,TTYCNV
       176742
003012 004567           JSR     R5,TTYCNV
       176736
003016 004567           JSR     R5,TTYCNV
       176732
003022 004567           JSR     R5,TTYCNV
       176726
003026 112721'          MOVB    #CR,(R1)+
       000000
003032 004567'          JSR     R5,MSGOUT
       000000
003036 003470'          .WORD   TTYBFR
003040 004767           JSR     PC,BLKLNE
       177704
003044 162700           SUB     #4,R0
       000004
003050 012701'          MOV     #TTYBFR+2,R1
       003472
003054 004767           JSR     PC,REDUCE
       177036
       003060 OPLINE=.
003060 112721'          MOVB    #CR,(R1)+
       000000
003064 004567'          JSR     R5,MSGOUT
       000000
003070 003470'          .WORD   TTYBFR
003072 022700'          CMP     #RECBFR+240.,R0
       003470
003076 003337           BGT     NXTLNE
003100 000167'          JMP     EXEC
       000000
003104 000000 RCCLB:    .WORD   0
003106 000000 RCLOCK:   .WORD   0
       003110          RECBFR=.
       003470          .=.+240.
       003470 TTYBFR=.
       003542          .=.+42.
              ;         FIRE TABLE DIRECTORY
003542 003602'FTD:      .WORD   FT0A    ;ADDR OF 0TA FIRE TABLE
003544 000000           .WORD   0       ;# OF ENTRIES IN TABLE
003546 005672'          .WORD   FT1A    ; FIRST TABLE
003550 000000           .WORD   0
U 003552 000000         .WORD   FT2A    ;2ND TABLE
003554 000000           .WORD   0
U 003556 000000         .WORD   FT3A    ;3RD TABLE
003560 000000           .WORD   0
U 003562 000000         .WORD   FT4A    ; DITTO ONLY 4TH
003564 000000           .WORD   0
U 003566 000000         .WORD   FT5A    ; 5TH
003570 000000           .WORD   0
```

```
U 003572 000000          .WORD    FT6A        ;6TH
  003574 000000          .WORD    0
U 003576 000000          .WORD    FT7A        ;7TH AND LAST
  003600 000000          .WORD    0
                  ;
                  ;
         003602  FT0A=.
                  ;
         005672  FT1A=.+1080.
         000001          .END
```

| | | | | | |
|---|---|---|---|---|---|
| ABASE | 000000R | AC | = ****** G | ASCTBN | 001222RG |
| ASC1 | 001242R | ASC2 | 001312R | BBASE | 000002R |
| BLANK | = ****** G | BLINE | = ****** G | BLKFIL | 002752R |
| BLKLNE | 002750R | BLKSUB | 002364R | BNL | 001406R |
| BNT | 001464R | BNTASC | 001324RG | BN2 | 001424R |
| BN3 | 001444R | BN4 | 001446R | BN5 | 001454R |
| CBASE | 000004R | CHRN | 000544RG | CHR1 | 000566R |
| CHR2 | 000612R | CLKSET | = ****** G | CMDXEC | 001526R |
| COMMA | = ****** G | COUNT | = ****** G | CR | = ****** G |
| CRECRD | = ****** G | DBASE | 000006R | DELETE | = ****** G |
| DIV | = ****** G | DSPEX | 000470R | DSPLY | 000452R |
| DSP1 | 000456R | DSP2 | 000472R | ERR | = ****** G |
| EXEC | = ****** G | FLDLNG | = ****** G | FTD | 003542RG |
| FT0A | = 003602R | FT1A | = 005672R | FT2A | = ****** |
| FT3A | = ****** | FT4A | = ****** | FT5A | = ****** |
| FT6A | = ****** | FT7A | = ****** | GETS1 | = ****** G |
| GETS2 | = ****** G | GETV | 002072R | GTLNUM | 000040RG |
| HANG | 002620R | INEXIT | = 000224R | INFCMD | = 167772 |
| INFST | = 167774 | INSERR | 000252R | INSERT | 000202RG |
| INSER1 | 000220R | INSRT | 000276R | INS1 | 000342R |
| INS2 | 000346R | ISMSG | 000262R | IZPOS | 002334R |
| LF | = ****** G | LINE | = ****** G | LINEA | = ****** G |
| LINEND | 000444RG | LIN1ST | 000442RG | LKS | = ****** G |
| LNBUF | 003142R | MODIFY | 000010RG | MOVDIG | 002360R |
| MOVSGN | 002000R | MQ | = ****** G | MSGOUT | = ****** G |
| MSQT1 | 000074R | MSQT2 | 000062R | MSQT3 | 000110R |
| MSQT4 | = 000124R | MSQT5 | 000044R | MUL | = ****** G |
| MVB | = ****** G | MVD | 001054R | MVDA | 001004R |
| MVDB | 001006R | MVDC | 001100R | MVDCL | 001016R |
| MVDD | 001076R | MVDN | 001040R | MVOLD | 000772R |
| MVC | 000664R | MVTD | 000742R | MVTE | 000740R |
| MVTLP | 000724R | MVTSQ | 000620R | NEWLN | 001134RG |
| NEWLNA | = ****** G | NFLDS | = ****** G | NOSOND | 001564R |
| NOTHOT | 001614R | NRED | = 003006R | NRND | 002302R |
| NXTCLK | 002612R | NXTLNE | 002776R | NZDIV | = 002276R |
| OPLINE | = 003060R | OPNCHG | 002076R | OPRECD | = 002772R |
| PC | =%000007 | PRINT | 000400RG | PSW | = ****** G |
| RCCLB | 003104R | RCLOCK | 003106R | RCOORD | 002250R |
| RECBFR | = 003110R | RECORD | = 002470RG | REDUCE | 002116R |
| RSTREG | 001720R | R0 | =%000000 | R1 | =%000001 |
| R2 | =%000002 | R3 | =%000003 | R4 | =%000004 |
| R5 | =%000005 | R6 | =%000006 | R7 | =%000007 |
| SHIFT | 001650R | SHLOOP | 001706R | SHSTAT | 001730R |
| SLNG | = ****** G | SP | =%000006 | SQTBL | = ****** G |
| SQTBLA | = ****** G | STBCK | 002634R | STPTST | = ****** G |
| TBLBLD | 000146RG | TBLBL1 | 000152R | TBUF | 001520R |
| TL1 | 000516R | TMSTRT | = ****** G | TMTL | 000616R |
| TSTCHG | 002470R | TSTC02 | 002506R | TTLNS | = ****** G |
| TTS | = ****** G | TTYBFR | = 003470R | TTYCNV | 001754R |
| TTYN | = ****** G | TTYOUT | = ****** G | TYPLN | 000512R |
| TYPTBL | 001744R | WRITE | = ****** G | XAXIS | = ****** G |
| XSIZE | = ****** G | YSIZE | = ****** G | ZDIV | = 002314R |
| ZEROS | 001206R | . | = 003602R | | |

It should be apparent to one skilled in the art that various modifications may be made in the present invention without departing from the spirit and scope thereof, as described in the specification and defined in the appended claims.

What is claimed is:

1. A method of providing realistic on-line fire responses in accordance with the accuracy of an on-line fire fighting sequence employed by a fire fighter, comprising the steps of:

dynamically simulating the image of an actual fire;
projecting said simulated fire image on a screen;
establishing a predetermined fire fighting sequence to be followed by the fire fighter for properly extinguishing the simulated fire;
loading said predetermined fire fighting sequence in the memory of a computer;
applying an input to said image projected on said screen in accordance with the on-line fire fighting sequence employed by the fire fighter in fighting said simulated fire;
monitoring said on-line fire fighting sequence employed by the fire fighter in fighting said simulated fire;

determining the points of application of said on-line input by said fire fighter;

supplying data to said computer in accordance with said on-line fire fighting sequence employed by said fire fighter;

comparing said actual fire fighting sequence and said points of application of the on-line input by the fire fighter with the predetermined fire fighting sequence stored in the computer; and changing the projected image of the simulated fire in accordance with the on-line input of the fire fighter and the predetermined fire fighting sequence stored in the computer.

2. The method recited in claim 1, including the further steps of:

dynamically simulating the heat and sound of said simulated actual fire; and changing said heat and said sound of said simulated fire in accordance with said on-line input of the fire fighter and the predetermined fire fighting sequence stored in the computer.

3. The method recited in claim 2, including the step of:

selectively occluding a portion of the simulated fire when there is a correspondence between the on-line input signals of the fire fighter in the actual fire fighting sequence and the predetermined fire fighting sequence loaded in the computer.

4. The method recited in claim 3, including the step of:

re-establishing the occluded portion of the simulated fire on the screen to simulate flashback in response to a deviation between the remainder of the on-line fire fighting sequence employed by the fire and the predetermined fire fighting sequence loaded in the computer.

5. The method recited in claim 1, including the further steps of:

simulating the sound and heat of said actual fire;

changing the image level of the simulated fire in accordance with a correspondence between the actual on-line fire fighting sequence employed by the fire fighter and the predetermined fire fighting sequence;

changing the sound level of the simulated fire in accordance with a correspondence between the actual on-line fire fighting sequence employed by the fire fighter and the predetermined fire fighting sequence; and changing the heat level of the simulated fire in accordance with a correspondence between the actual on-line fire fighting sequence employed by the fire fighter and the predetermined fire fighting sequence.

6. A method of providing realistic on-line responses in accordance with the accuracy of an on-line fire fighting sequence employed by a fire fighter, comprising the steps of:

simulating the visual effects of a fire, including flames and smoke;

simulating the audio effects of a fire;

simulating the heat effects of a fire;

projecting said visual effects on a screen;

establishing a predetermined fire fighting sequence to be followed by the fire fighter for properly extinguishing the simulated fire and eliminating the heat and audio effect of the simulated fire;

storing the data representing the predetermined fire fighting sequence in the memory of a computer;

applying an input to said visual effects projected on said screen in accordance with the on-line fire fighting sequence employed by the fire fighter in fighting said simulated fire;

monitoring said on-line fire fighting sequence employed by the fire fighter in fighting said simulated fire;

supplying input data to the computer in accordance with the on-line fire fighting sequence employed by the fire fighter;

comparing said input data supplied to the computer with the data representing the predetermined fire fighting sequence stored in the memory of the computer;

changing the simulated audio effects and heat effects of the simulated fire in accordance with a correspondence between the data representing the on-line fire fighting sequence employed by the fire fighter and the data representing the predetermined fire fighting sequence;

selectively occluding a portion of the simulated fire when there is a correspondence between the data representing the on-line fire fighting sequence employed by the fire fighter and the data representing the predetermined fire fighting sequence stored in the computer; and re-establishing the occluded portion of the fire to simulate flashback in response to deviations between the input data to the computer representing the remainder of the on-line fire fighting sequence and the data stored in the computer representing the predetermined fire fighting sequence.

7. A dynamic fire simulator and trainer for providing realistic on-line fire responses in accordance with the accuracy of an on-line fire fighting sequence employed by a fire fighter, comprising:

dynamic fire simulation means for simulating the occurrence of an actual fire, including a screen and means for projecting visual representation of actual flames and smoke on said screen;

a computer for storing data representing a preprogrammed fire fighting sequence to be followed by the fire fighter for properly extinguishing the fire;

monitoring means on said screen including a plurality of transducer for monitoring the actual on-line fire fighting sequence employed by the fire fighter in fighting the simulated fire on said screen and for supplying input data representing the on-line fire fighting sequence employed by the fire fighter to said computer;

said computer including means for comparing the input data representing the on-line fire fighting sequence employed by the fire fighter with te data representing the preprogrammed fire fighting sequence; and control means for providing a reaction in the representation of the actual flames and smoke projected on said screen in accordance with the comparison between the input data representing on-line fire fighting sequence employed by the fire fighter and the data representing the preprogrammed fire fighting sequence to provide realistic on-line fire responses on said screen.

8. The fire simulator and trainer claimed in claim 7, wherein:

said dynamic fire simulation means includes a motion picture projector for providing a motion picture image of flames and smoke, a rear projection screen for receiving the motion picture image, and a mirror for reflecting the motion picture image onto said rear projection screen; and said control means includes a shutter means electrically coupled to said computer means and responsive to output signals therefrom, said shutter means being positioned in the path of said motion picture image and including a plurality of shutter elements capable of occluding or transmitting portions of the motion picture image in response to output signals from said computer means.

9. The fire simulator and trainer claimed in claim 8, wherein:

said control means activates heater means and audio means electrically coupled to said control means in response to signals from said computer means to provide variable heat and audio outputs in accordance with a correspondence between the data representing the preprogrammed fire fighting sequence and the data representing the on-line fire fighting sequence employed by the fire fighter.

10. The fire simulator and trainer claimed in claim 8, wherein:

said dynamic fire simulation means also includes a scene projector for providing a static image of an object and said motion picture projector providing a dynamic indication of flames and smoke emanating from the object.

11. The fire simulator and trainer claimed in claim 8, including:

fire extinguisher means under control of the fire fighter for projecting input signals onto said screen.

12. A dynamic fire simulator and trainer for providing realistic on-line fire responses in accordance with the accuracy of an on-line fire fighting sequence employd by a fire fighter, comprising:

dynamic fire simulation means including a scene projector for projecting a static image of an object, a moving picture projector for projecting a dynamic fire image, including flames and smoke, optical means for combining the static and dynamic images, a rear projection screen to receive the combined images and provide a realistic representation of an actual fire thereon;

a computer having memory means for storing a preprogrammed fire fighting sequence indicating the proper fire fighting technique to be employed by the fire fighter in extinguishing the fire;

a plurality of spaced transducers arranged to detect input signals applied to said screen by the fire fighter in an actual on-line fire fighting sequence and generate output signals in accordance therewith;

fire extinguisher means under control of the fire fighter for projecting input signals onto said screen;

controller means for receiving output signals from said transducers and providing output signals to said computer, said controller means providing output control signals in response to input signals from said computer;

said computer comparing the actual on-line fire fighting sequence employed by the fire fighter with the preprogrammed fire fighting sequence to provide the input signals to said controller means during the actual on-line fire fighting sequence;

shutter means responsive to control signals from said controller means to occlude selective portions of the dynamic fire image in response to output signals from said computer indicating a correspondence between the preprogrammed fire fighting sequence stored in said computer and the actual on-line fire fighting sequence employed by the fire fighting, and to uncover previously occluded portions of the dynamic fire image in response to deviations between the remainder of the acutal on-line fire fighting sequence employed by the fire fighter and the preprogrammed fire fighting sequence to simulate flashback;

heater means responsive to control signals from said controller means to reduce the amount of heat reaching the fire fighter during a proper on-line fire fighting sequence and to increase the amount of heat reaching the fire fighter during an improper on-line fire fighting sequence; and audio means responsive to control signals from said controller means to reduce the level of the sound reaching the fire fighter during a proper on-line fire fighting sequence and to increase the level of sound reaching the fire fighter during an improper on-line fire fighting sequence.

* * * * *

UNITED STATES PATENT AND TRADEMARK OFFICE
CERTIFICATE OF CORRECTION

PATENT NO. : 4,001,949
DATED : January 11, 1977
INVENTOR(S) : David N. Francis

It is certified that error appears in the above-identified patent and that said Letters Patent are hereby corrected as shown below:

Column 1, line 43, "experiences" should be -- experience --

Column 1, line 44, "which" should be inserted before "were"

Column 5, line 23, "pratical" should be -- practical --

Column 5, lines 25 & 26, "obsurce" should be -- obscure --

Column 8, line 65, "controllogic" should be -- control logic --

Column 10, line 24, "systme" should be -- system --

Column 68, line 56, "te" should be -- the --

Signed and Sealed this

Twenty-ninth Day of March 1977

[SEAL]

Attest:

RUTH C. MASON
*Attesting Officer*

C. MARSHALL DANN
*Commissioner of Patents and Trademarks*